United States Patent [19]
Kennedy et al.

[11] Patent Number: 5,804,664
[45] Date of Patent: Sep. 8, 1998

[54] STAR POLYMERS HAVING MULTIPLE ARMS EMANATING FROM A CALIXARENE CORE, INITIATORS THEREFOR, AND METHOD FOR THE SYNTHESIS THEREOF

[76] Inventors: Joseph P. Kennedy, 910 St. Andrew St., Akron, Ohio 44303; Istvan J. Majoros, 4175 Americana Dr., C-6, Stow, Ohio 44224; Sunny Jacob, 685 Sherman St., #5, Akron, Ohio 44311

[21] Appl. No.: 862,581

[22] Filed: May 23, 1997

[51] Int. Cl.$^6$ ................................................ C08L 53/02
[52] U.S. Cl. .................... 525/314; 525/267; 525/398; 525/401; 525/502; 526/135; 526/136; 526/209; 526/237
[58] Field of Search ................................ 525/267, 314, 525/398, 401, 480, 502; 526/135, 136, 209, 237, 86

[56] References Cited

U.S. PATENT DOCUMENTS

| | | | |
|---|---|---|---|
| 4,870,144 | 9/1989 | Noda et al. | 526/348.7 |
| 5,169,914 | 12/1992 | Kaszas et al. | 526/348.7 |
| 5,248,746 | 9/1993 | Shimokawa et al. | 526/348.7 |
| 5,395,885 | 3/1995 | Kennedy et al. | 525/98 |
| 5,428,111 | 6/1995 | Faust et al. | 525/314 |

FOREIGN PATENT DOCUMENTS 0149540  8/1985  Japan .

OTHER PUBLICATIONS

"Calixarenes. 4. The Synthesis, Characterization, and Properties of the Calixarenes from *p-tert*-Butylphenol" by Gutsche et al., *J. Am. Chem. Soc.*, 103, pp. 3782–3792 (1981).
"Calixarenes 12 The Synthesis of Functionalized Calixarenes" by Gutsche et al., *Tetrahedron*, vol. 42, No. 6, pp.1633–1640 (1986).
"Conventional and Living Carbocationic Polymerizations United. I. A Comprehensive Model and New Diagnositc Method to Probe the Mechanism" by Majoros et al., *Advances in Polymer Science*, vol. 112, pp. 1–114 (1994).
"Delocalized Carbanions Linear and Star Polymers by Anionic Initiation" by Gordon III et al., *Polymer Bulletin* 11, 349–352 (1984).
"Effect of Arm Number and Arm Molecular Weight on the Solid–State Morphology of Poly(styrene–isoprene) Star Block Copolymers" by Alward et al., *Macromolecules*, 19, 215–224 (1986).
"Initiation via Halobration in Living Cationic Polymerization. 1. The Polymerization of Isobutylene" by Balogh et al., *Macromolecules*, 27, 3453–3458 (1994).
"Living Carbocationic Polymerization III. Demonstration of the Living Polymerization of Isobutylene" by Faust et al., *Polymer Bulletin*, 15, pp. 317–323 (1986).
"Living carbocationic polymerization XIX. Synthesis of four–arm star polyisobutylenes capped by t–chlorine and isopropylidene grous" by Huang et al., *Polymer Bulletin*, 19, pp. 43–50 (1986).

"Living Carbocationic Polymerization. XXIII. Analysis of Slow Initiation in Living Isobutylene Polymerization" by Zsuga et al., *J. Macromol. Sci.–Chem.*, A26(9), pp, 1305–1319 (1989).
"Living Carbocationic Polymerization. XLIX. Two–Stage Living Polymerization of Isobutylene to Di–*tert*–Chlorine Telechelic Polyisobutylene" by Chen et al., *J.M.S—Pure Appl. Chem.*, A29(8), pp. 669–679 (1992).
*Macromolecular Engineering Recent Advances* "Hexaarmed Polystyrene Stars from a Newly Designed Initiator of Carbocationic Polymerization" by Cloutet et al., *Macromolecular Engineering*, pp. 47–65 (1995).
"Methacrylate Star Synthesis by GTP" by Simms, *Rubber Chemistry and Technology*, vol. 64, pp. 139–151 (1990).
"Multi–arm star polyisobutylenes" by Marsalko et al., *Polymer Bulletin*, 31, pp. 665–672 (1993).
"Multi–Arm Star Polyisobutylenes. IV. Polyisobutylene Arms Connected to a Cyclosiloxane Core" by Omura, The Maurice Institute of Polymer Science, The University of Akron, pp. 1–26 (1996)?.
"Multifunctional Coupling Agents for Living Cationic Polymerization. 3. Synthesis of Tri–and Tetraarmed Poly(vinyl ethers) with Tri–and Tetrafunctional Silyl Enol Ethers" by Fukui et al., *Macromolecules*, 27, pp. 1297–1302 (1994).
"New developments in star polymer synthesis. Star–shaped polystyrenes and star–block copolymers" by Lutz et al., *Macromol. Chem.*, 189, pp. 1051–1060 (1988).
"New Telechelic Polymers and Sequential Copolymers by Polyfunctional Initiator–transfer Agents (Inifers) 14. Characterization of Linear and Three–arm Star Polyisobutylenes by Degradative Oxidation" by Kennedy, *Polymer Bulletin*, 5, pp. 5–10 (1981).
"Polymerization The Effect of $H_2O$ and HCl on Isobutylene Polymerization Coinitiated by $CCl_3$" by Kennedy et al., *Polymer Bulletin*, 15, pp. 201–208 (1986).
"Preparation and Characterization of a Star–Shaped Polymer" by Fijumoto et al., *Macromolecules*, vol. 11, No. 4, pp. 673–677 (1978).
"Preparation and Properties of Monodisperse Branched Polystyrene" by Morton et al., *Journal of Polymer Science*, vol. 57, pp. 471–182 (1962).

(List continued on next page.)

*Primary Examiner*—Mark L. Warzel
*Attorney, Agent, or Firm*—Renner, Kenner, Greive, Bobak, Taylor & Weber

[57] ABSTRACT

The synthesis and characterization of novel linear polymers and multi-arm star polymers comprising polyisobutylene arms connected to a well-defined calixarene core are described. The synthesis has been achieved using the "core first" method wherein multifunctional calix[n]arene (where n=4 to 16) derivatives or their monofunctional analogues are used as initiators which, in conjunction with certain Freidel-Crafts acids as co-initiators, induce the living polymerization of isobutylene or a similar carbocationic polymerizable monomer to form star polymers or block copolymers. Novel initiators suitable for inducing the polymerization are also described.

15 Claims, 15 Drawing Sheets

OTHER PUBLICATIONS

"Preparation et caracterisation de polymeres–modele a structure en etoile, par copolymerisation sequencee anionique" by Worsfold et al., *Canadian Journal of Chemistry*, vol. 47, pp. 3379–3385 (1969).

"Preparation of Asymmetric Three–Arm Polybutadiene and Polystyrene Stars" by Pennisi, *Macromolecules*, 21, pp. 1094–1099 (1988).

"Preparation of Star–Branched Polymers with Cyclotriphosphazene Cores" by Chang et al., *Macromolecules*, 27, pp. 1376–1380 (1994).

"Simultaneity of Initiation and Propagation in Living Polymer Systems" by Szwarc, *Macromolecules*, 20, pp. 445–448 (1987).

"Star polymers from sytrene and divinylbenzene" by Eschwey et al., *Polymer*, vol. 16, pp. 180–184 (1975).

"Star–Shaped Polymers by Living Cationic Polymerization. 1. Synthesis of Star–Shaped Polymers of Alkyl Vinyl Ethers" by Kanaoka et al., *Macromolecules*, vol. 24, No. 9, pp. 2309–2313 (1991).

"Tri–Armed Star Polymers by Living Cationic Polymerization. 1. Trifunctional Initiators for Living Polymerization of Isobutyl Vinyl Ether" by Shohi et al., *Macromolecules*, 24, pp. 4926–4931 (1991).

STAR POLYMERS HAVING MULTIPLE ARMS EMANATING FROM A CALIXARENE CORE, INITIATORS THEREFOR, AND METHOD FOR THE SYNTHESIS THEREOF

The research disclosed in this application was at least partially supported by the National Science Foundation under Grant 94-23202.

TECHNICAL FIELD

This invention relates generally to star polymers and, more particularly, to the carbocationic polymerization of monomers such as isobutylene via the "core first" method. Specifically, this invention relates to the synthesis of well-defined star polymers having well-defined arms of polyisobutylene and block copolymers thereof emanating from a calixarene core. The synthesis is accomplished by the use of novel multifunctional calixarene derivative initiators which, in conjunction with certain Friedel-Crafts acids which act as coinitiators, induce the living (carbocationic) polymerization of isobutylene. The resultant star polymers have a well-defined core as well as well-defined arms and are advantageously directly telechelic.

BACKGROUND OF THE INVENTION

The synthesis of various multi-arm radial or star polymers have become of growing practical and theoretical interest to a variety of industries. Such star polymers are seen as useful as, inter alia, surfactants, lubricants, rheology modifiers, and viscosity modifiers or control agents. In fact, star polymers are now considered by many to be state-of-the-art viscosity modifiers and oil additives, although the potential of some of these star polymers for these applications is still being evaluated and tested.

The synthesis of well-defined star polymers having a narrow polydispersity (i.e., uniform arm length) and a readily determinable, definite number of arms and arm molecular weight by known analytical techniques is still a significant challenge to the macromolecular engineer, however. Considerable efforts have been made to prepare star-like structures having arms made of various materials and ranging in number from about 2 to at least as many as 250 or more. However, to date, three major techniques or processes have been described and/or used for the synthesis of star polymers. These three techniques are typically distinguished from each other by (1) the use of multifunctional linking agents, (also known as the "core and arm first" method); (2) the sequential copolymerization/linking with a divinyl monomer, (also known as the "arm first" method); and (3) the use of multifunctional initiators (also known as the "core first" method).

With respect to the processes using multifunctional linking agents, such agents have proven useful, in conjunction with anionic polymerization techniques, in preparing homo-, block-, and hetero-arm star polymers with varying number of arms. Multifunctional linking agents have also been used in conjunction with carbocationic polymerization techniques to prepare well defined tetra-arm poly(isobutyl vinyl ether) stars, and multi-arm polyisobutylene stars. In the latter instance, the polyisobutylene stars were prepared by hydrosilation of allyl-terminated polyisobutylenes with siloxane cores.

Linking living polymer chains with divinyl monomer(s) is also well known and has been used for the synthesis of multi-arm stars by anionic, cationic and group transfer polymerization techniques.

However, the use of multifunctional initiators for the synthesis of multi-arm star polymers has not been as thoroughly developed in certain respects. For anionic polymerization systems, the use of multifunctional initiators is somewhat limited due to relatively poor initiator solubility in hydrocarbon solvents. However, at least two studies have shown that hydrocarbon-swollen polydivinylbenzene can be used as multifunctional anionic initiators. Unfortunately, the dispersity of the star polymers was rather broad in each of these studies. Still other studies have recently used a hydrocarbon-soluble trifunctional initiator for preparing homo-, block-, and functionalized star polymers.

The solubility problems of multifunctional initiators have been found to be less severe with cationic polymerizations, and di-, tri- and tetra-functional initiators have been used to prepare well-defined two-, three- and four-arm star polymers under certain conditions and with certain initiators. However, except for two reports on the synthesis of hexa-arm polystyrene and hexa-arm poly(oxazoline), little, if any, progress has been made in the use of well-defined multifunctional initiators for the preparation or synthesis of higher functionality stars.

Among the many advantages of using multifunctional initiators with carbocationic polymerizable monomers such as isobutylene is that the resultant stars are directly telechelic. By "directly telechelic", it is meant that the resultant star polymer, e.g., polyisobutylene, will automatically have a functional group at the end of each arm of the star polymer upon termination of the polymerization reaction. That is, chain end functionality of the polyisobutylene arms is preserved during formation of the star. In comparison, other star polymers require an additional process step to provide end chain functionality.

There has been a growing interest in star polymers consisting of multiple polyisobutylene (PIB) arms. For example, Kennedy et al. U.S. Pat. No. 5,395,885 describes the synthesis of star polymers having multiple PIB arms and polydivinylbenzene (PDVB) cores using cationic, "arm-first", synthesis techniques. Because the structure of polyisobutylene is readily characterized and contains no unsaturation, these PIB-based stars are believed to be useful for a variety of applications such as motor oil additives and viscosity index improvers. However, their potential is still being evaluated and tested, and in motor oil additives where certain properties such as, for example, sensitivity oxidation, is of critical importance, the possibility remains that, because of the use of ill-defined, crosslinked aromatic cores such as PDVB, the PIB-PDVB stars may not be highly desirable for such use. By the term "ill-defined" it is meant that the core of the star polymer, e.g., PDVB, is an uncontrolled, crosslinked, gel-like structure having unsaturation sites in the core. In comparison, "well-defined" cores are built of readily characterizable, soluble molecules which are precursors to the core. As a result, the structure of the resultant star polymers having well-defined cores can be controlled.

Also, it is possible that the resultant star polymers having well-defined cores may impart better resistance to mechanical/chemical degradation than star polymers using ill-defined cores. That is, the presence of unsaturation sites (i.e., double bonds) in the ill-defined cores (PDVB) provides for the possibility that the resultant star polymers will be more sensitive to oxidative reactions than the star polymers having well-defined cores. Thus, in engine oil where sensitivity to oxidation is of critical importance, the possibility exists that during high temperature use and heavy shear in the engine, the ill-defined cores will undergo oxidative degradation.

Furthermore, PIB stars with ill-defined cores have a polydispersity of at least 1.4 or larger. Quantification of the number of arms and arm molecular weight is also not readily determined using conventional analytical techniques.

In the present invention, calixarenes are seen as a potential solution to the existing problems of ill-defined cores. Calixarenes are cyclic condensation products of a p-substituted phenol and formaldehyde. Various procedures have been developed by Gutsche et al. for the selective synthesis of various calixarenes and calixarene derivatives. Detailed descriptions of these procedures are set forth in various publications by Gutsche et al., including Gutsche, C. D., *Calixarenes*, The Royal Society of Chemistry, Thomas Graham House, Cambridge, (1989); Gutsche, C. D. et al. "Calixarenes. 4. The Synthesis, Characterization, and Properties of the Calixarenes for p-tert-Butylphenol", *J Am. Chem. Soc.* 103, 3782 (1981); and Gutsche, C. D. and L. G. Lin, "Calixarenes 12 The Synthesis of Functionalized Calixarenes" *Tetrahedron* 42(6), 1633 (1986), the disclosures of each of which are incorporated herein by reference. To date, it is known that Gutsche and others have produced calix[n]arenes, where n=4 to 16.

Of further interest is the production of novel thermoplastic elastomers (TPEs) using the "core first" method. While PIB-based triblock TPEs have been disclosed previously, the "core first" synthesis of these calixarene core/block-arm star polymers has, heretofore, been unknown.

SUMMARY OF INVENTION

It is therefore, an object of the present invention to provide a composition of matter having a plurality of well-defined polyisobutylene arms connected to a well-defined calix[n]arene (n=4 to 16) core.

It is another object of the present invention to provide a composition of matter, as above, wherein the composition is directly telechelic.

It is still another object of the present invention to provide a composition of matter, as above, which has a more definite number of arms, a more definite arm molecular weight, and a narrower polydispersity as compared to compositions having ill-defined cores.

It is another object of the present invention to provide a novel thermoplastic elastomer comprising polyisobutylene block-arms radiating from the calixarene core.

It is yet another object of the present invention to provide an initiator for the polymerization of carbocationic polymerizable monomers such as isobutylene.

It is still another object of the present invention to provide an initiator, as above, which is a derivative of calixarene such that polymerization results in the formation of a well-defined calixarene core.

It is a further object of the present invention to provide a method for the carbocationic polymerization of monomers such as polyisobutylene or polystyrene.

It is still a further object of the present invention to provide a method for the polymerization of monomers, as above, by using a multifunctional initiator.

At least one or more of the foregoing objects, together with the advantages thereof over the known art relating to multi-arm star polymers and the synthesis thereof, which shall become apparent from the specification which follows, are accomplished by the invention as hereinafter described and claimed.

In general, the present invention provides a composition of matter comprising a core component selected from the group consisting of a p-methoxy cumyl group and a calix[n]arene where n=4 to 16; and N number of arms of polyisobutylene connected to the core component, where N=1 when the core component is the p-methoxy cumyl group and N=n, when the core component is the calix[n]arene, and wherein the composition is directly telechelic.

Other objects and aspects of the invention which will become apparent herein are attained by a composition of matter suitable for use as a cationic polymerization initiator having the structure

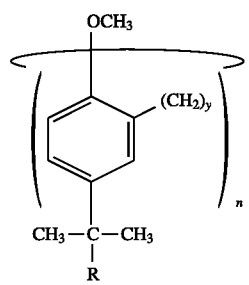

wherein R is selected from the group —OCH$_3$, —OH, and —Cl and wherein y=0 to 1, and when y=0, n=1, and when y=1, n=4 to 16.

Still other objects and aspects of the invention which will become apparent herein are attained by a cationic polymerization initiator comprising a material selected from the group consisting of the tert-methoxy, tert-hydroxy, and tert-Cl derivatives of

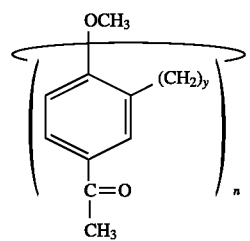

wherein y=0 to 1, and when y=0, n=1, and when y=1, n=4 to 16.

Still other objects and aspects of the invention which will become apparent herein are attained by a composition of matter comprising a core component selected from the group consisting of a p-methoxy cumyl group and a calix[n]arene where n=4 to 16; and N number of arms containing at least one segment of polyisobutylene connected to the core component, where N=1 when the core component is the p-methoxy cumyl group and N=n, when the core component is the calix[n]arene. The arms of the composition of matter may further include at least one segment, incompatible with polyisobutylene, formed by cationic polymerization of a monomer other than isobutylene which is connected to the terminus end of the polyisobutylene to provide a polyisobutylene-based block copolymer.

The present invention also includes a method for the carbocationic polymerization of a monomer which results in the formation of a polymer, comprising reacting (1) an initiator selected from the group consisting of the tert-methoxy, tert-hydroxy, and tert-Cl derivatives of

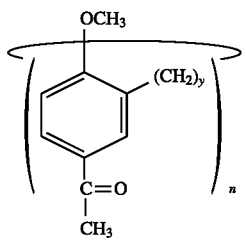

wherein y=0 to 1, and when y=0, n=1, and when y=1, n=4 to 16, and (2) at least one Friedel-Crafts acid with (3) at least a portion of the monomer in at least one solvent at cryogenic temperature and in the presence of an electron pair donor and a proton scavenger.

The present invention further includes a method for the synthesis of a star polymer having a plurality of arms of polyisobutylene emanating from a calixarene core comprising reacting (1) an initiator selected from the group consisting of the tert-methoxy, tert-hydroxy, and tert-Cl derivatives of calix[n]arene wherein n=4 to 16, and (2) at least one Friedel-Crafts acid with (3) at least a portion of isobutylene in at least one solvent at cryogenic temperature and in the presence of an electron pair donor and a proton scavenger.

BRIEF DESCRIPTION OF THE DRAWINGS

For a complete understanding of the objects, techniques, structure of and characterization of the invention, reference should be made to the following detailed description of a preferred embodiment and the accompanying drawings wherein.

PREFERRED EMBODIMENT FOR CARRYING OUT THE INVENTION

Figure 1:
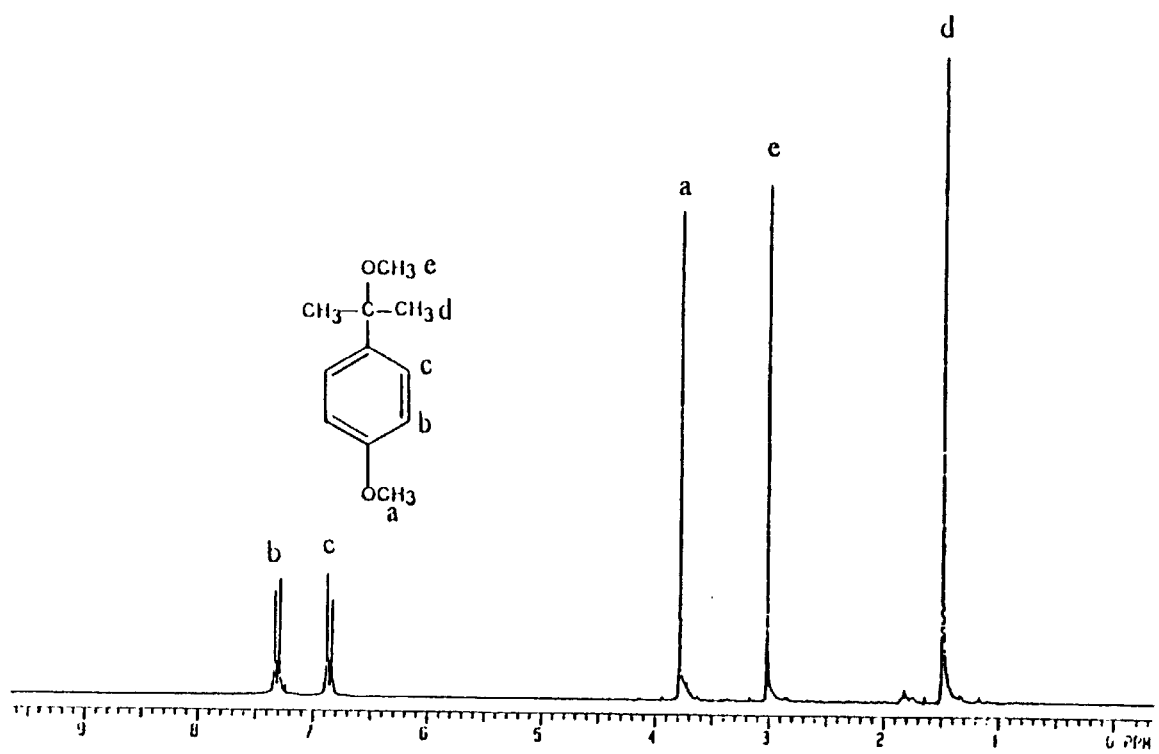
FIG. 1 is a representative $^1$H NMR (CDCl$_3$) spectrum of 2-(p-methoxyphenyl)-2-methoxypropane.

Broadly, the present invention is directed toward the production or synthesis of a series of novel compositions of matter, each having a structure comprising a first component, referred to hereinafter as a "core", comprising a p-methoxy cumyl group or a calixarene, connected to one or more second components, referred to hereinafter as the "arm" or "arms", selected from the group consisting of homopolymers and copolymers, particularly block copolymers, and the like, wherein at least a first segment of the polymer or copolymer comprises a cationic polymerizable monomer such as, for example, isobutylene, styrene and its derivatives (such as the p-halo styrenes and the p-alkyl styrenes). A second segment, incompatible with the first, selected from a cationic polymerable monomer other than the monomer of the first and preferably aromatic, may also be added subsequent to the polymerization of the first segment to provide a star block copolymer. It will be appreciated that, where calixarene is the core, the composition will have a plurality of polymer arms radially extending therefrom. Hence, the term "star polymer" is used to describe these multi-arm types of compositions.

The synthesis of these compositions of matter has been accomplished by the use of the "core first" method wherein a mono- or multi-functional initiator is used, in conjunction with at least one Freidel-Crafts acid, to induce the living (carbocationic) polymerization of a monomer such as isobutylene. In other words, it has been found that the use of tert-methoxy, tert-hydroxy, and tert-Cl derivatives of the p-methoxy cumyl group or the calixarene and at least one Friedel-Crafts acid such as, for example, $BCl_3$, $TiCl_4$, and mixtures thereof, with at least a portion of a carbocationic polymerizable monomer such as isobutylene, in at least one solvent at cryogenic temperature and in the presence of an electron pair donor and a proton scavenger produces the desired polymer composition. Moreover, and potentially more importantly, the resultant polymer composition is directly telechelic, meaning the chain end of the polymer arms remain functionalized upon termination of the polymerization reaction. Thus, the subsequent addition of other cationic polymerizable monomers, such as, for example, styrene, can be used to form various copolymers such as polyisobutylene-block-polystyrene, and other potentially useful thermoplastic elastomers.

Where a monofunctional initiator is used, only one arm will extend from the core. It will be appreciated that the monofunctional initiators suitable for use according to the concepts of the present invention are the tert-methoxy, tert-hydroxy, and tert-Cl derivatives of

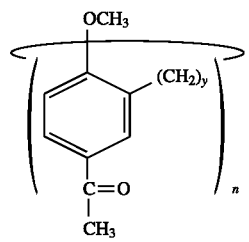

wherein y=0 and n=1. That is, the monofunctional initiators have the structure

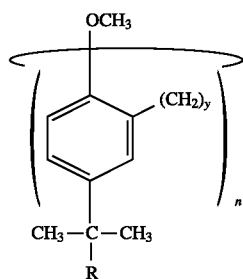

wherein R is selected from the group —$OCH_3$, —OH, and —Cl and wherein y=0 and n=1. It will be appreciated that when n=1, the structure is not cyclic. Examples of such monofunctional initiators suitable for use in the present invention include but are not necessarily limited to 2-(p-methoxyphenyl)-2-propanol and 2-(p-methoxyphenyl)-2-methoxypropane.

Where a multifunctional initiator is used, a plurality of arms equal to the number of functional sites on the initiator may extend from the core. Thus, where calixarene derivatives are used as initiators, the number of arms, N, will depend upon the number of cyclic units, n, in the calixarene product since each cyclic unit has one functional site. It is conventional in the art to refer to the number of cyclic units and, thus, the number of functional sites on a calixarene by denoting the product as calix[n]arene where n equals the number of cyclic units.

In the present invention, the tert-methoxy, tert-hydroxy, and tert-Cl derivatives of calix[n]arenes where n=4 to 16 are used as multifunctional initiators. That is, the multifunctional initiators suitable for use according to the concepts of the present invention are the tert-methoxy, tert-hydroxy, and tert-Cl derivatives of

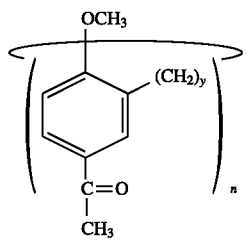

wherein y=1 and n=4 to 16. In other words, the multifunctional initiators have the structure

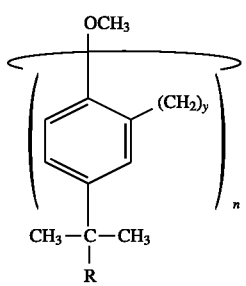

wherein R is selected from the group —$OCH_3$, —OH, and —Cl and wherein y=1 and n=4 to 16. The tert-methoxy, tert-hydroxy, and tert-Cl derivatives of calix[n]arenes where n=6 to 16 are more preferred and, in the most preferred embodiment, those derivatives of calix[8]arene derivatives are used. Of the three specified derivatives, the tert-methoxy derivative is used preferentially because it is soluble in polymerization charges ($CH_3Cl$/hexanes) at −80° C. Examples of preferred multifunctional (octafunctional) initiators suitable for use in the present invention are the tert-methoxy, tert-hydroxy, and tert-Cl derivatives of 5,11,17,23,29,35,41,47-octaacetyl-49,50,51,52,53,54,55,56-octamethoxycalix[8]arene, namely 5,11,17,23,29,35,41,47-(2-hydroxypropyl)-49,50,51,52,53,54,55,56-octamethoxycalix[8]arene and 5,11,17,23,29,35,41,47-(2-methoxypropyl)-49,50,51,52,53,54,55,56-octamethoxycalix[8]arene.

Upon review of the initiators disclosed herein, it will be appreciated that the monofunctional initiators may be considered analogues of the multifunctional initiators of the present invention. While the main constituents of the derivative initiators, i.e., the p-methoxy cumyl group and calixarenes, are known in the art, this is believed to be the first synthesis of the tert-methoxy, tert-hydroxy, and tert-Cl derivatives of these compounds. Moreover, it is these derivatives, in conjunction with at least one Friedel-Crafts acid, which have been found to be uniquely successful in inducing the living (carbocationic) polymerization of monomers like isobutylene and styrene to produce novel compositions such as star polymers having multiple polyisobutylene arms emanating from well-defined calixarene cores, the polymers being directly telechelic as defined hereinabove.

With respect to co-initiators, at least one Friedel-Crafts acid may be used as a co-initiator in the polymerization process, and any known Friedel-Crafts acid suitable as a co-initiator for carrying out the polymerization reaction may be used in the present invention. Although both BCl$_3$ and TiCl$_4$ are believed satisfactory when used alone under certain reaction conditions, polymerization is especially satisfactory in the presence of BCl$_3$ and TiCl$_4$, and well-defined stars having close to theoretical composition and molecular weights can be obtained. Especially preferred in the use of BCl$_3$ first and then TiCl$_4$ in the two-stage process, discussed hereinbelow.

With respect to suitable monomers, the monomer may be any carbocationic polymerizable monomer. Examples of such monomers include isobutylene and styrene as well as derivatives of styrene such as, for example, p-chloro styrene. The preferred monomer for the present invention is isobutylene which, upon carbocationic polymerization in the presence of a multifunctional calixarene initiator and a Friedel-Crafts acid as co-initiator, forms multiple polyisobutylene arms emanating from a calixarene core. It will be appreciated, however, that subsequent addition of other monomers may provide useful copolymers, including, for example where styrene is added to the preferred polymerized isobutylene reaction, polystyrene-polyisobutylene block copolymers can be formed. Any cationic polymerizable monomer substantially incompatible with the monomer used in the first addition polymerization can be added to form the block copolymer. For example, derivatives of styrene, are also particularly suitable for this subsequent addition. Such derivatives include the p-halo styrenes such as p-chloro styrene or -fluoro styrene, the -alkyl styrenes such as p-methyl styrene, α-methyl styrene and indene. Other potentially useful monomers include β-pinene and norbornene.

Furthermore, at least one solvent should be used in the synthesis. Such a solvent should be capable of solubilizing the initiator, the Friedel-Crafts acid, and the monomer as well as the polymer. However, the solvent should not be capable of undergoing polymerization itself during the formation of the polymer and must not permit termination or chain transfer to occur. Thus, certain solvents such as THF are specifically excluded. Examples of exemplary solvents suitable for use in the present invention include but are not necessarily limited to the chlorinated alkanes, CH$_2$Cl$_2$, hexanes, carbon dioxide, and mixtures thereof, with CH$_3$Cl being preferred under certain conditions.

The polymerization reaction is further carried out in the presence of an electron pair donor and a proton scavenger. Any known electron pair donor and proton scavenger suitable for use with the other constituents of the polymerization process as described herein may be used. Among the preferred electron pair donor suitable for use are, inter alia, dimethylacetamide (DMA), dimethyl sulfoxide (DMSO), dimethylphthalate (DMP), pyridine and its derivative triethylamine (TEA), with DMA being most preferred. Examples of proton scavengers include di-tert-butylpyridine (DtBP) and its methyl derivatives with DtBP being most preferred.

In a preferred polymerization process, the polymerization process is carried out in two stages in one reactor. In the first stage, the initiator is dissolved in a first solvent, followed sequentially by a portion of the amount of monomer required for polymerization, and a first Friedel-Crafts acid at a cryogenic temperature in the presence of an electron pair donor and a proton scavenger to induce polymerization. Then, in a second stage, an additional amount of solvent or a second and/or additional solvent(s), the balance of the monomer, and additional and/or a second Freidel-Crafts acid are added in sequence. To quench or otherwise terminate the polymerization reaction, a terminating agent such as methanol may be added. A further description of this procedure is set forth in Chen, C., J. Si, and J. Kennedy, "Living Carbocationic Polymerization. XLIX. Two-Stage Living Polymerization of Isobutylene to Di-tert-Chlorine Telechelic Polyisobutylene", J. M. S.-Pure Appl. Chem., A29(8), 669 (1992), the disclosure of which is incorporated herein by reference.

Resultant star polymer compositions, unlike many other star polymers, have been found to have well-defined cores as well as well-defined arms. Moreover, characterization of these resultant compositions have been found that they have a more definite number of arms, a more definite core molecular weight, a more definite arm molecular weight, and a narrower polydispersity as compared to compositions having an ill-defined core component. In fact, the composition of the present invention have been found to have a polydispersity far less than 1.4 and typically in the range of about 1.1 to about 1.15.

Also, as noted hereinabove, the resultant polymers were directly telechelic. Where the terminating agent employed to quench the polymerization reaction is methanol, it will be appreciated that the end of each arm of the resultant composition will have a tert-Cl functional group. When such is the case, the composition can easily be further functionalized based upon various known techniques such as dehydrochlorination or substitution of the tert-Cl group.

Thus, it will be appreciated that, in a preferred embodiment of the present invention, the synthesis of well-defined polyisobutylene star polymers is accomplished by the use of tert-methoxy, tert-hydroxy, and tert-Cl derivatives of calix[n]arene (n=4 to 16) as multifunctional initiators, in conjunction with at least one Freidel-Crafts acid as a co-initiator, to induce the living (carbocationic) polymerization of isobutylene. The polymerization is carried out in at least one solvent at cryogenic temperature and in the presence of an electron pair donor and a proton scavenger.

In order to demonstrate practice of the present invention, several star polymer compositions comprising eight polyisobutylene (PIB) arms emanating from a calix[8]arene core were prepared as well as using other polyisobutylene compositions derived from the monofunctional analogues described hereinabove. The synthesis of the star polymers was accomplished by the use of octafunctional calixarene derivative initiators which, in conjunction with mixed BCl$_3$/TiCl$_4$ coinitiators, induce the living polymerization of isobutylene. The initiators were tert-hydroxy- and tert-methoxy derivatives of 5,11,17,23,29,35,41,47-octaacetyl-49,50,51,52,53,54,55,56-octamethoxycalix(8)arene. The tert-methoxy derivative, 5,11,17,23,29,35,41,47-(2-methoxypropyl)-49,50,51,52,53,54,55,56-octamethoxycalix[8]arene, is soluble in polymerization charges (CH$_3$Cl/hexanes) at −80° C. and was therefore used preferentially.

In other words, the precision synthesis of calix[8]arene 5,11,17,23,29,35,41,47-(2-methoxypropyl)-49,50,51,52,53,54,55,56-octamethoxycalix[8]arene carrying eight initiating sites for the living polymerization of isobutylene was carried out, and then, the resultant octafunctional initiator was used to induce the living polymerization of isobutylene to desirable arm lengths. Where possible, schemes have been included to help visualize the structures involved and the key steps of this "core-first" synthesis strategy.

With respect to experiments using the monofunctional analogue of the octafunctional initiators, 2-(p-methoxyphenyl)-2-methoxypropane was found to be the preferred initiator.

The following examples demonstrate that calixarene derivatives and their analogues can be used as mono- or multifunctional initiators for the synthesis of well-defined PIB stars or linear polymers and are provided for illustrative purposes only. These examples should not be construed as limiting the scope of the invention in any way, the scope of the invention being determined by the claims presented herein.

EXAMPLES

The multi-arm star polymers and linear (monofunctional) polymeric compositions of matter prepared in accordance with the present invention were synthesized in essentially two separate steps—(1) preparation of the initiator and (2) polymerization of the monomer. All of the resultant linear and star compositions were characterized using gel permeation chromatography (GPC) analysis. The gel permeation chromatograph was equipped with on-line RI, UV and LLS detectors, which were used to determine the molecular weight and composition of the linear and octa-arm polymers prepared.

Where core destruction of the star polymer was necessary for determination of number average number of arms and weight average number of arms, the star polymer, for example, $\overline{M}_n$ (LLS)=1.048±0.02×10$^5$ g/mol from Example 4 hereinbelow, 0.26 g, was dissolved in 25 mL CCl$_4$ in a 250 mL two-neck round bottom flask fitted with a condenser and N$_2$ inlet. A mixture of 14 mL trifluoroacetic acid and 4 mL 30% aqueous H$_2$O$_2$ was added with stirring. The charge was refluxed at 75°–80° C.; samples were withdrawn in 2 hour intervals, quenched by methanol, evaporated to dryness, redissolved in hexanes, precipitated using methanol and dried in vacuum. A single peak by GPC analysis for the sample withdrawn after 16 hours, indicated complete core destruction. $\overline{M}_n$(LLS)=1.366±0.09×10$^4$ g/mol.

Control experiments were carried out under identical conditions using a linear PEP ($\overline{M}_n$~10,000 g/mol, $\overline{M}_w$/$\overline{M}_n$=1.2) and 5,11,17,23,29,35,41,47-octa-tert-butyl-49,50,51,52,53,54,55,56-octahydroxycalix[8]arene. GPC analysis of the samples indicated that calixarenes underwent oxidation to form low molecular weight products whereas PIB survived oxidation.

The resultant compositions were also characterized using $^1$H NMR and $^{13}$C NMR spectra recorded by a Varian Gemini-200 spectrometer using standard 5 mm tubes at room temperature. Sample concentrations for $^1$H NMR and $^{13}$C NMR spectroscopy were ~30 mg and ~50 mg respectively in suitable solvents. For $^1$H NMR spectroscopy 64 FIDs were collected and for $^{13}$C NMR spectroscopy more than 4000 FIDs were collected. Melting points of the octafunctional initiators were determined by a Dupont's Differential Scanning Calorimeter in N$_2$ atmosphere. Elemental analyses were performed by Galbriath Laboratories Inc., Knoxville, Tenn.

The molecular weight of the polymers was determined by GPC (Waters Co.) equipped with a series of five $\mu$-Styragel columns (100, 500, 10$^3$, 10$^4$, and 10$^5$), RI detector (Waters 410 Differential Refractometer), UV detector (440 Absorbance Detector), WISP 7103 with Nelson Analytical Interfaces. The columns were calibrated using narrow molecular weight PIB standards. Approximately 20 mg of polymer and a few crystals of sulfur (internal standard) were dissolved in 4 mL THF, the solution was filtered by using a 0.2 $\mu$m Acrodisc filter (membrane type PTFE). The polymer solution (100 $\mu$L) was injected into the column using the auto injector. The Nelson Analytical Gel Permeation Chromatography Software (version 4.0) was used for data analysis.

The molecular weights of the star polymers were determined by a laser light scattering (LLS) detector (Wyatt Technology Corporation). The dn/dc values were obtained by using an Optilab 903 (Wyatt Technology Corporation) instrument. Samples for light scattering were prepared with care to avoid the presence of particulate matter. Thus, polymers were dissolved in prefiltered THF by 0.025 $\mu$m Whatman Anotop 25 filters, the solutions were filtered using 0.2 $\mu$m Acrodisc filters (membrane type PTFE), evaporated to dryness in air under dust-free conditions, and further dried in vacuum until all THF was removed. Polymer solutions of known concentrations (e.g., 1.5×10$^{-4}$ g/$\mu$L) were made in prefiltered THF using the 0.025 $\mu$m Whatman Anotop 25 filter. Polymer solutions (100 $\mu$L) were injected into the columns using the auto injector. The Astra software (version 4.00, Wyatt Technology Corporation) was used for data analysis.

Preferred embodiments for carrying out the invention for each of the preferred monofunctional initiators and octafunctional initiators are more particularly discussed hereinbelow.

A. Preparation of Monofunctional Initiators

In a preferred method for the preparation of the tert-hydroxy derivative of the monofunctional initiators, 2-(p-methoxyphenyl)-2-propanol, a 500 mL three-neck flask was equipped with a mechanical stirrer, addition funnel and water condenser was purged with nitrogen. Methylmagnesium bromide (3M) 143 g, 138 mL, (0.41 mol) was added dropwise followed by 50 mL of distilled THF. p-Methoxy acetophenone, 31.1 g (0.21 mol) was then dissolved in 100 mL THF and was added dropwise to the Grignard reagent over a period of one hour. The rate of addition was reduced when the rate of solvent reflux was high. After 12 hours stirring at room temperature the mixture was slowly added to ice-cold water. Aqueous NH$_4$Cl, (50%) was added to dissolve most of the gelatinous precipitate. The aqueous layer was extracted five times with 50 mL portions of diethyl ether, the ether extract was dried over MgSO$_4$, and the solvent was evaporated under vacuum. The reaction yielded 91% of a clear colorless liquid which was determined to be 2-(p-methoxyphenyl)-2-propanol based upon $^1$H NMR spectroscopy. $^1$H NMR (CDCl$_3$): δ=7.4, 7.3 (d,2 aromatic H ortho to —OCH$_3$), 6.9, 6.8 (d,2, aromatic H ortho to isopropyl group), 3.8 (s,3. —OCH$_3$), 1.8 (s,1, —OH), 1.5 (s,6,>C(CH$_3$)$_2$).

In order to prepare 2-(p-methoxyphenyl)-2-methoxypropane, the tert-methoxy derivative of the monofunctional initiator, a 500 mL three-neck flask equipped with a mechanical stirrer and condenser was purged with nitrogen. 31.2 g (0.19 mol) of 2-(p-methoxyphenyl)-2-propanol was then dissolved in 200 mL THF. Sodium hydride, 13.5 g (0.56 mol), was added with caution. When the bubbling was over, 160 g (1.08 mol) CH$_3$I were added dropwise to the charge. After stirring at room temperature for 16 hours, the reaction was quenched by adding cold water, the organic layer was extracted three times with 50 mL portions of ether, the ether extract was dried over MgSO$_4$, and the solvent was evaporated under vacuum. 95% of the crude product 2-(p-methoxyphenyl)-2-methoxypropane was yielded. Vacuum distillation at 15 mm Hg at 145° C. yielded essentially pure 2-(p-methoxyphenyl)-2-methoxypropane as determined by $^1$H NMR spectroscopy. The resultant $^1$H NMR spectrum of 2-(p-methoxyphenyl)-2-methoxypropane is shown in FIG. 1. $^1$H NMR (CDCl$_3$: δ=7.3 (d,2, aromatic H ortho to —OCH$_3$), 3.0 (s, 3, tert-OCH$_3$) 1.5 (s,6,>C(CH$_3$)$_2$). The following provides the reaction scheme as described above for the preparation of these two monofunctional initiators.

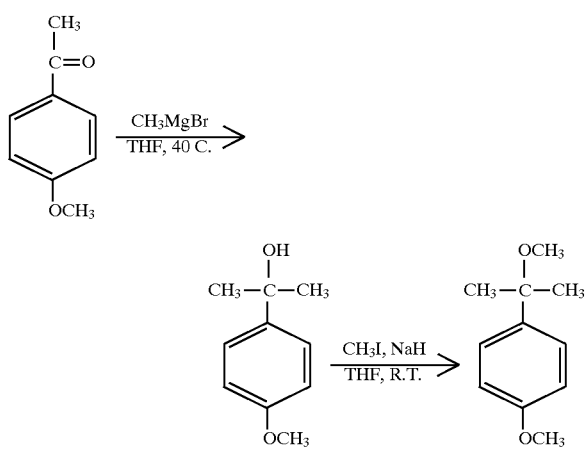

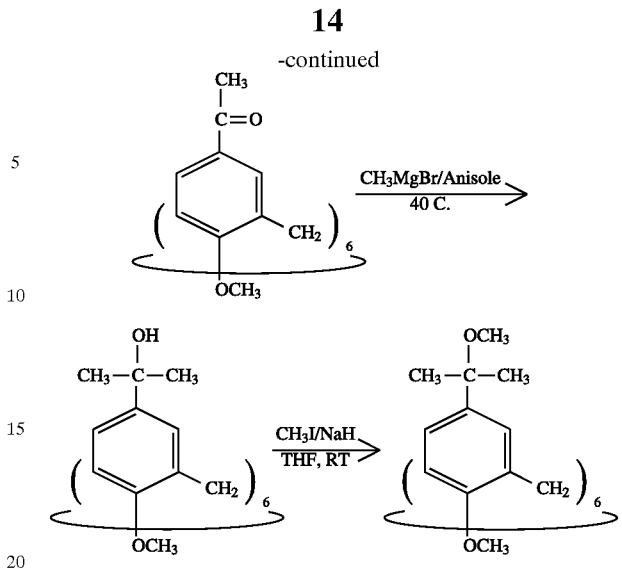

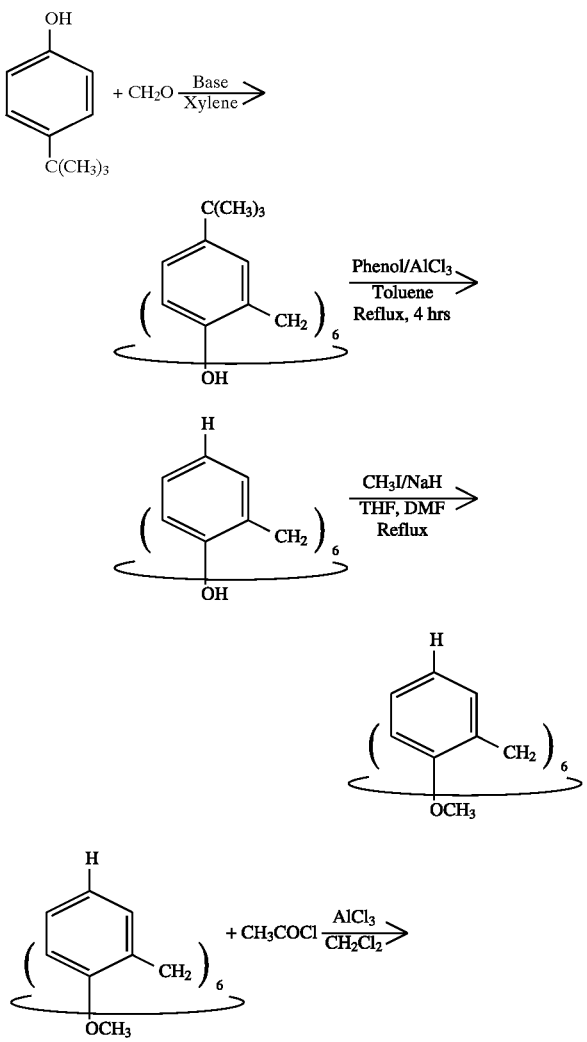

B. Preparation of Octafunctional Initiators

Next, to prepare the octafunctional initiators 5,11,17,23,29,35,41,47-(2-hydroxypropyl)-49,50,51,52,53,54,55,56-octamethoxycalix[8]arene and 5,11,17,23,29,35,41,47-(2-methoxypropyl)-49,50,51,52,53,54,55,56-octamethoxycalix[8]arene, the following synthetic route was used.

The first four steps have been described by Gutsche et al. as reported hereinabove. The first step involves the cyclic condensation of p-tert-butylphenol and p-formaldehyde in the presence of KOH to obtain the octafunctional 5,11,17,23,29,35,41,47-Octa-tert-butyl-49,50,51,52,53,54,55,56-octahydroxycalix[8]arene. The second step is the dealkylation of the p-tert-butyl group by $AlCl_3$ in the presence of phenol in toluene to give 49,50,51,52,53,54,55,56-octahydroxycalix[8]arene. The third step involves protection of the —OH group as the methyl ether to afford 49,50,51,52,53,53,54,55,56-octamethoxycalix[8]arene, which enables the subsequent Friedel-Crafts acylation to 5,11,17,23,29,35,41,47-octaacetyl-49,50,51,52,53,54,55,56-octamethoxycalix[8]arene.

From this point, a 1000 mL three-neck flask equipped with stirrer, condenser, and an addition funnel, was purged with nitrogen, and 339 g (1.01 mmol) of methyl magnesium bromide were added dropwise. In a separate round bottom flask 9.1 g (6.96 mmol, 55.7 mmol —CO—$CH_3$) of 5,11,17,23,29,35,41,47-octaacetyl-49,50,51,52,53,54,55,56-octamethoxycalix[8]arene was dissolved in 900 mL of hot (~70° C.) anisole, cooled, and added dropwise to the Grignard solution over a period of one hour at 40° C. After stirring at room temperature for 30 hours, the charge was added to ice-cold water. Aqueous $NH_4Cl$, (50%) was added to dissolve most of the gelatinous precipitate. The aqueous layer was extracted five times with 50 mL portions of anisole and a small amount of ether. The organic layer was dried over $MgSO_4$, filtered, and the product precipitated using excess hexane. The solid was filtered, washed with hexane to remove traces of anisole, and dried in vacuum to give a 72% yield of 5,11,17,23,29,35,41,47-(2-Hydroxypropyl)-49,50,51,52,53,54,55,56-octamethoxycalix[8]arene. According to NMR analyses the product was essentially pure. $^1H$ NMR: ($CDCl_3$) $\delta$=6.9 (s,2,Ar—H), 4.0 (s, 2, —$CH_2$—), 3.5 (s,3,—$OCH_3$), 155.6 (aromatic C attached to —$OCH_3$), 133.8 (aromatic C attached to —$CH_2$— bridge), 30.5 (C of $CH_2$— bridge), 125.8 (aromatic C attached to H), 145.3 (aromatic C attached to isopropyl group), 72.1 (tert-C attached to —OH group), 31.5 (—$CH_3$ of isopropyl group); Elemental analysis (MWt. Calc. for $C_{88}H_{112}O_{16}$—1433 g/mol), Calc.: C, 74.15%; H, 7.86%; Obsd: C, 73.73%; H, 8.36%. mp(DSC)=174° C.

Figure 2:
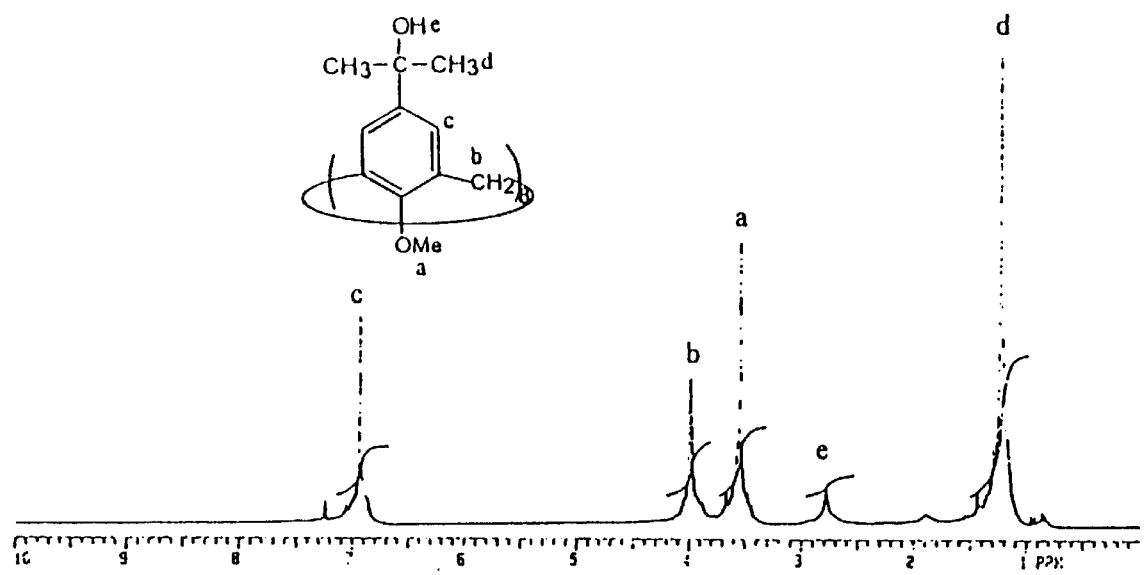
FIG. 2 is a representative $^1$H NMR (CDCl$_3$) spectrum of 5,11,17,23,29,35,41,47-(2-hydroxypropyl)-49,50,51,52,53,54,55,56-octamethoxycalix[8]arene.
Figure 3:
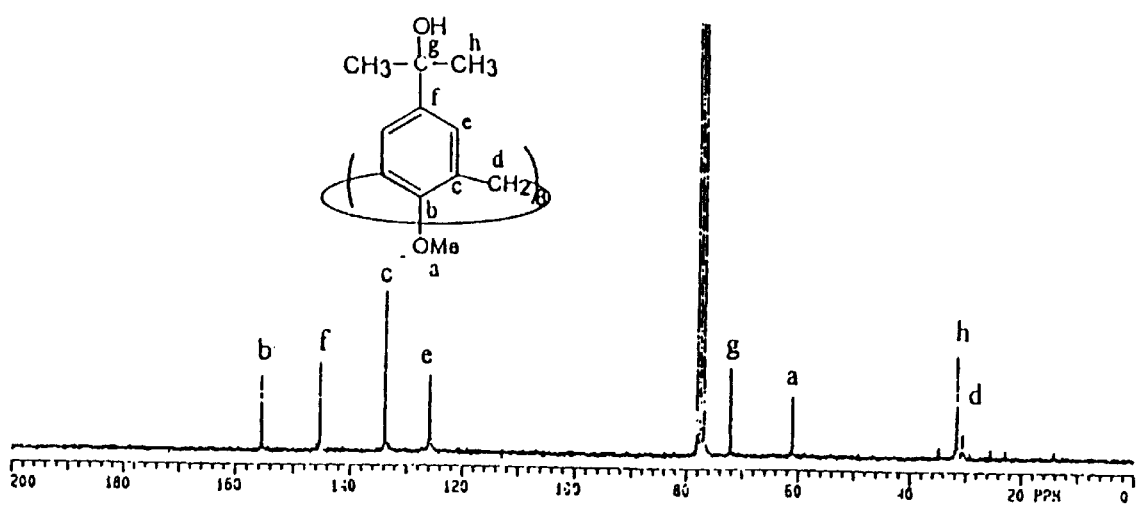
FIG. 3 is a representative $^{13}$C NMR (CDCl$_3$) spectrum of 5,11,17,23,29,35,41,47-(2-hydroxypropyl)-49,50,51,52,53,54,55,56-octamethoxycalix[8]arene.

Next, in a 250 mL three-neck flask equipped with stirrer and condenser, 4 g (2.79 mmol, 22.3 mmol OH) of 5,11,17,23,29,35,41,47-(2-hydroxypropyl)-49,50,51,52,53,54,55,56-octamethoxycalix[8]arene were dissolved in 150 mL of THF. Sodium hydride, 1.62 g (67.5 mmol), was added with caution. When the bubbling was over, CH$_3$I, 32.0 g (225.7 mmol), was added dropwise to the charge. After stirring for 16 hours at room temperature, the reaction was quenched by adding 50 mL cold water. The organic layer was extracted 5 times with 50 mL portions of ether, the ether extract was dried over MgSO$_4$, and the solvent was evaporated to yield a very pale yellow solid, which was triturated with hexanes and washed with hexanes to afford pure 5,11,17,23,29,35,41,47-(2-methoxypropyl)-49,50,51,52,53,54,55,56-octamethoxycalix[8]arene at a 75% yield. That is, $^1$H NMR and $^{13}$C NMR spectroscopy, shown in FIGS. 2 and 3, respectively, indicated the presence of essentially pure 5,11,17,23,29,35,41,47-(2-hydroxypropyl)-49,50,51,52,53,54,55,56-octamethoxycalix[8]arene. Elemental analysis of 5,11,17,23,29,35,41,47-(2-hydroxypropyl)-49,50,51,52,53,54,55,56-octamethoxycalix[8]arene showed a slightly higher H content (8.36%) than the calculated value (7.86%). The difference may be due to the tendency of the hydroxyl groups to form hydrogen bonds with water. Product recovery from the filtrate could be maximized by evaporating at room temperature. $^1$H NMR: (CDCl$_3$) δ=6.9 (s,2,Ar—H), 4.0 (s,2, —CH$_2$—), 3.4 (s,3,—OCH$_3$), 2.9 (s,3,tert-OCH$_3$), 1.3 (s,6,>C(CH$_3$)$_2$); $^{13}$CNMR: δ=60.8 (—CH$_3$ of Ar—OCH$_3$), 156.0 (aromatic C attached to —OCH$_3$), 134.0 (aromatic C attached to —CH$_2$— bridge), 30.5 (C of —CH$_2$— bridge), 127.0 (aromatic C attached to H), 141.2 (aromatic C attached to isopropyl group), 76.7 (tert-C attached to —OMe group), 28.0 (—CH$_3$ of isopropyl group), 50.6 (C in CH$_3$—O— of —C(CH$_3$)$_2$—OMe); Elemental analysis: (MWt. Calc. for C$_{96}$H$_{128}$O$_{16}$—1536 g/mol), Calc.: C, 75.13%; H, 8.36%; Obsd.: C, 75.14%; H, 8.64%. mp(DSC)=240° C.

Figure 4:
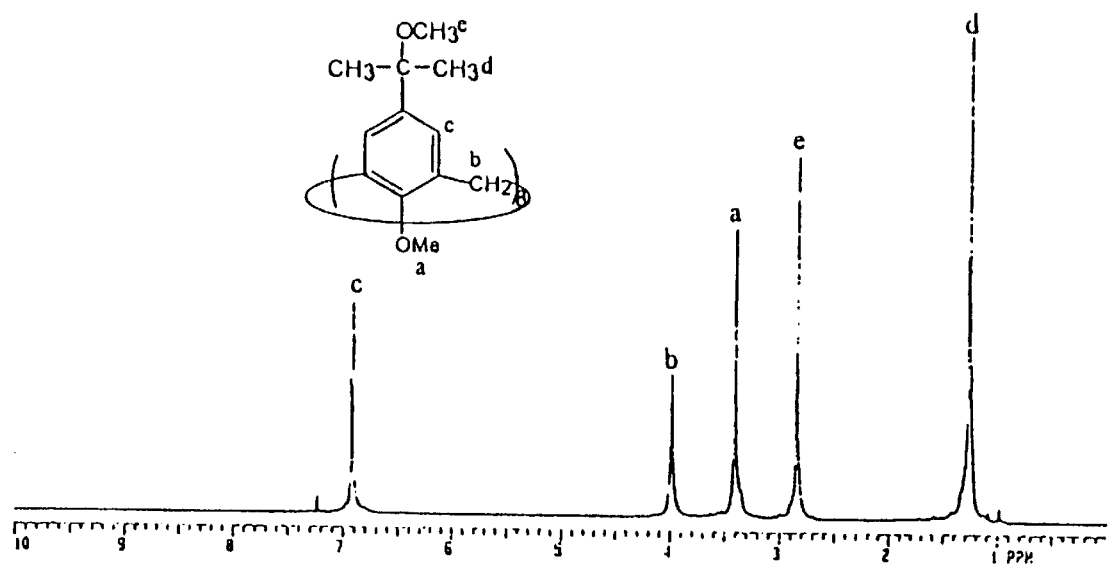
FIG. 4 is a representative $^1$H NMR (CDCl$_3$) spectrum of 5,11,17,23,29,35,41,47-(2-methoxypropyl)-49,50,51,52,53,54,55,56-octamethoxycalix[8]arene.
Figure 5:
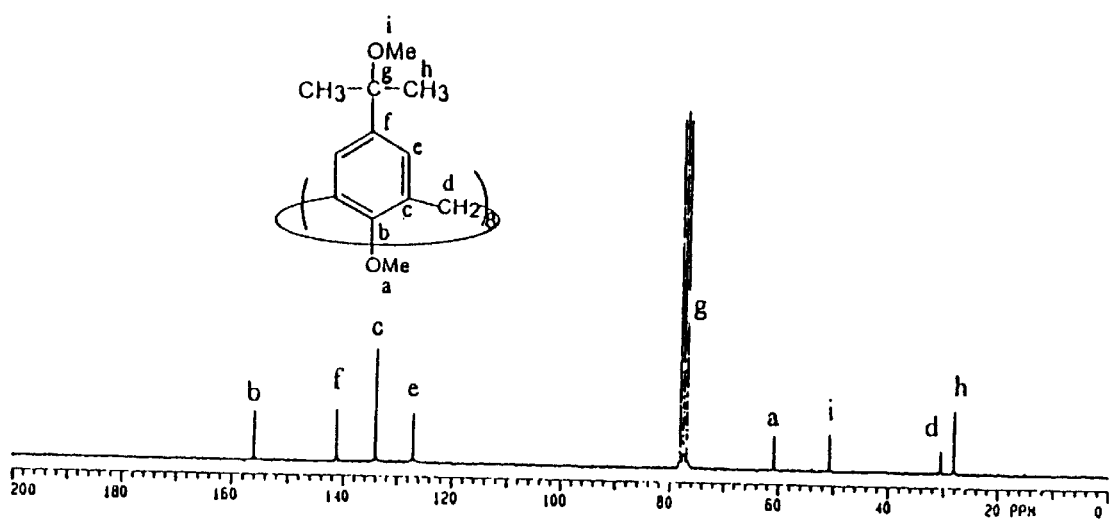
FIG. 5 is a representative $^{13}$C NMR (CDCl$_3$) spectrum of 5,11,17,23,29,35,41,47-(2-methoxypropyl)-49,50,51,52,53,54,55,56-octamethoxycalix[8]arene. The peak corresponding to tert-C attached to —OMe group, δ=76.7 ppm is superimposed on the CDCl$_3$ peaks.

Conversion of the tert-OH of 5,11,17,23,29,35,41,47-(2-hydroxypropyl)-49,50,51,52,53,54,55,56-octamethoxycalix[8]arene to the tert-ether derivative 5,11,17,23,29,35,41,47-(2-methoxypropyl)-49,50,51,52,53,54,55,56-octamethoxycalix[8]arene was carried out under basic conditions by using CH$_3$I at room temperature in THF. The $^1$H NMR and $^{13}$CNMR spectra are shown in FIGS. 4 and 5, respectively, and elemental analysis indicated the presence of eight tert-ether groups in 5,11,17,23,29,35,41,47-(2-methoxypropyl)-49,50,51,52,53,54,55,56-octamethoxycalix[8]arene.

C. Polymerizations Using Monofunctional Initiators

The new monofunctional initiator 2-(p-methoxyphenyl)-2-methoxypropane was used as a monofunctional model of the octafunctional initiator 5,11,17,23,29,35,41,47-(2-methoxypropyl)-49,50,51,52,53,54,55,56-octamethoxycalix[8]arene to initiate the living (carbocationic) polymerization of isobutylene using mixed Freidel-Crafts acids, BCl$_3$ and TiCl$_4$, as coinitiators in CH$_3$Cl-hexanes mixture (40:60) as solvent at −80° C. The two stage procedure described hereinabove was followed with only minor variations.

Specifically, the polymerizations were carried out in 75 mL culture tubes in a stainless steel glove box under dry nitrogen at −80° C. The volume of the charge was 29 mL. In the first stage, the addition sequence of the reactants was: CH$_3$Cl (7–8 mL), monomer (33% of the required amount), initiator 2-(p-methoxyphenyl)-2-methoxypropane, dimethylacetamide (DMA), di-tert-butylpyridine (DtBP), and BCl$_3$. Stock solutions of initiator, DMA, DtBP, and BCl$_3$ were prepared in CH$_3$Cl. Care was taken not to freeze the TiCl$_4$, and the balance amount of monomer was added. Additions were made such that the CH$_3$Cl:hexanes ratio should remain 40:60 and the final volume be 29 mL. By using the "all monomer in" (AMI) technique, parallel runs were terminated using prechilled methanol at different times. The "incremental monomer addition" (IMA) technique was also carried out for diagnostic purposes. The solvents were evaporated, and the polymer was redissolved in hexanes. The hexanes layer was washed with 5% HCl, water, and methanol, and the polymer was dried in vacuo at room temperature. These polymers have a 4-methoxyphenyl group on one end and a tert-Cl group at the other end.

In a similar polymerization process and as described above, polymerizations were again carried out in 75 mL culture tubes in a dry-box at −80° C. This time, initiator 2-(p-methoxyphenyl)-2-methoxypropane, 0.17 g (9.6×10$^{-4}$ mol), was dissolved in 25 mL CH$_3$Cl, then, in sequence, isobutylene (4 mL), DMA (6.62×10$^{-2}$M), and DtBP (3.41× 10$^{-2}$M) were added, and the polymerization was induced by the addition of 1.14 mL (0.53M) BCl$_3$. After 3 hours the polymerization was quenched with prechilled methanol and the polymer was purified as described above. $^1$H NMR was recorded in CDCl$_3$ and in shown in FIG. 7. These oligomers have a 4-methoxyphenyl group on one end and a tert-Cl group at the other end.

In order to better understand the polymerization, the following scheme is provided.

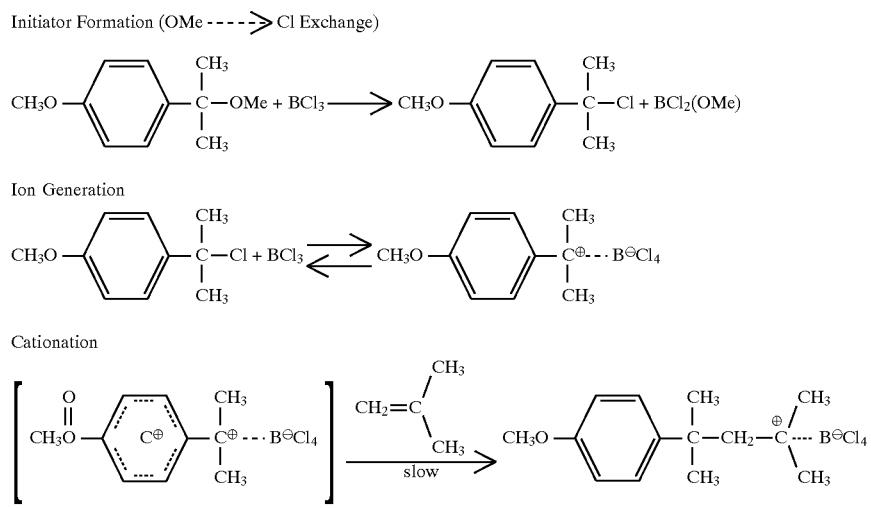

Overall, including Propagation

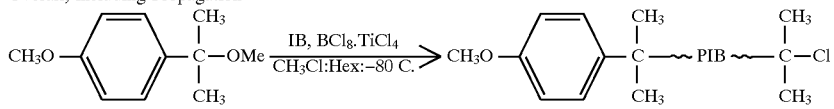

As shown above, during the first stage of the two stage process, in the presence of a small amount of the monomer plus BCl₃ in CH₃Cl, initiator formation, ion generation, cationation and very slow propagation take place. As indicated by the low conversions and very low average molecular weights, only a few units of isobutylene are added to the initiator. During the second stage however, the polymerization is continued by the addition of TiCl₄, plus the required amount of hexanes and the balance of isobutylene. The reaction is carried to the conversion level. The $\overline{M}_n$ (g/mol) versus Wp,(g) plots indicate slow initiation, i.e., the observed molecular weights are initially higher than theoretical and converge to the theoretical value at higher conversions. Slow initiation is most likely due to the formation of a resonance stabilized carbonation, which causes cationation to be rate limiting.

Figure 6:
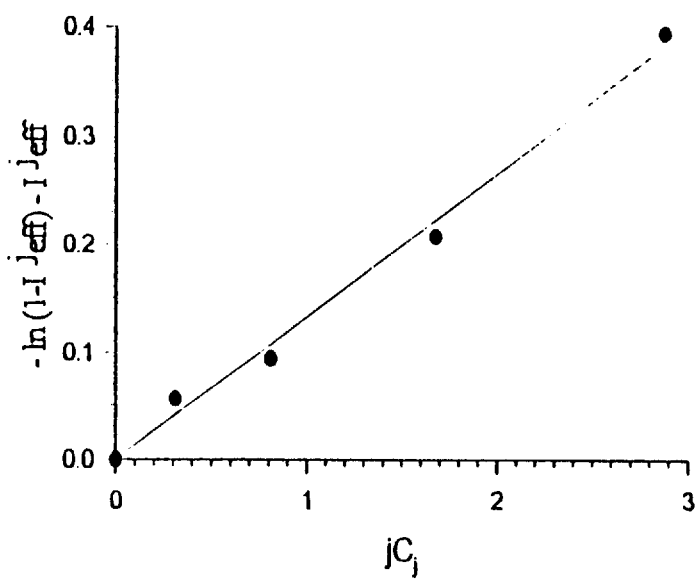
FIG. 6 is a plot of $-\ln(1-I_{eff}^j)-I_{eff}^j$ versus $jC_j$ from results obtained by incremental monomer addition (IMA) polymerization experiments of isobutylene with 2-(p-methoxyphenyl)-2-methoxypropane as initiator and BCl$_3$—TiCl$_4$ coinitiators. Conditions for the tests were as follows: [I$_0$]=4.97×10$^{-3}$M, [BCl$_3$]=3.97×10$^{-2}$M, M, [TiCl$_4$]=2.48×10$^{-2}$M, [DMA]=9.93×10$^{-3}$M, [DtBP]=1.03×10$^{-2}$M, total volume=29 Ml, ΔIB=1 mL, Δt=60 min.
Figure 7:
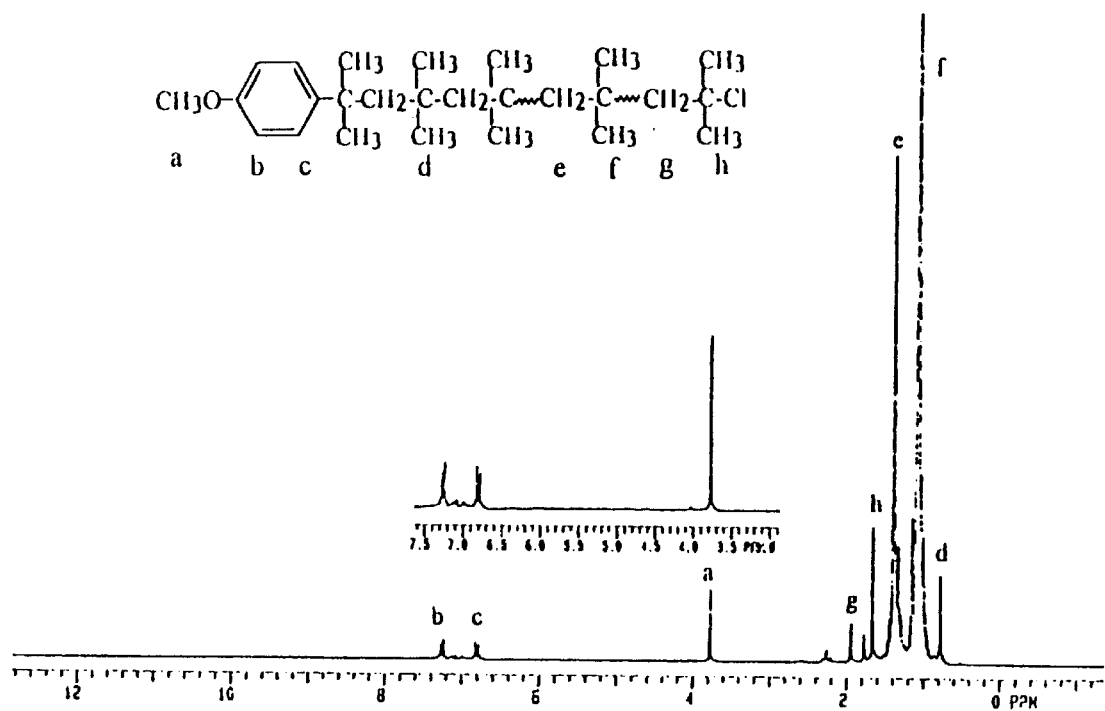
FIG. 7 is a representative $^1$H NMR (CDCl$_3$) spectrum of isobutylene oligomers ($\overline{M}_n$=1600 g/mol) prepared by 2-(p-methoxyphenyl)-2-methoxypropane initiator and BCl$_3$ coinitiator.

To prove livingness, experiments were carried out by using the incremental monomer addition (IMA), method and the data were plotted according to the equation derived for slow initiation in living carbocationic polymerization.

$$j\frac{k_c}{k_p}\frac{[\Delta M]}{[I_o]}C_j = -\ln(1-I_{eff}^j)-I_{eff}^j$$

where j is the number of monomer increments, $k_c$ and $k_p$ are the rate constants of cationation and propagation, respectively, [ΔM] is the total amount of monomer increment, [I₀] is the initiator concentration, $C_j$ is the apparent monomer conversion and $I_{eff}^j$ is the initiator efficiency at j increments. FIG. 6 shows a plot of $-\ln(1-I_{eff}^j)-I_{eff}^j$ versus $jC_j$. The linearity of the plot starting from the origin indicates living polymerization with slow initiation. To determine whether the primary ether group stays intact during polymerization and work-up, isobutylene oligomers were prepared to facilitate analysis. FIG. 7 shows a representative ¹H NMR spectrum. ¹H NMR analysis showed quantitative initiator incorporation (δ=7.4–6.8 ppm) and the presence of Ar—OCH₃ (δ=3.8 ppm) in the polymer.

D. Polymerizations Using Multifunctional Initiators

Figure 8:
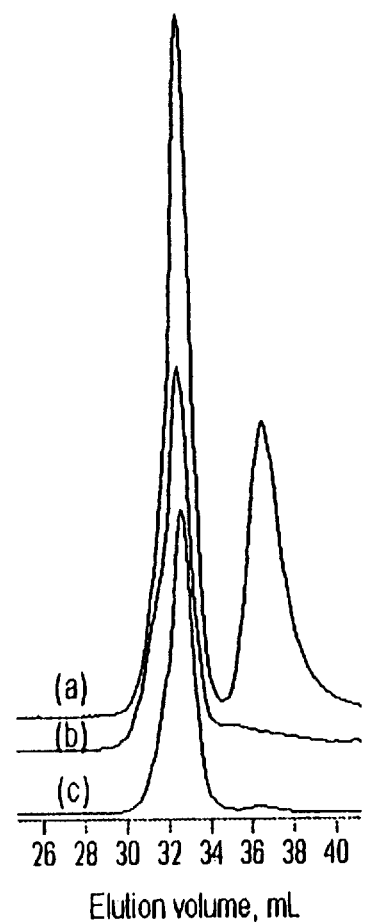
FIG. 8 is a set of gel permeation chromatograms of (a) a trace of the refractive index (RI) of the polymers before fractionation, (b) a UV trace of the polymers before fractionation, and (c) a RI trace of the stars after fractionation, obtained by using the 5,11,17,23,29,35,41,47-(2-hydroxypropyl)-49,50,51,52,53,54,55,56-octamethoxycalix[8]arene/BCl$_3$—TiCl$_4$ initiating system.

The procedure similar to the one described above was followed with some changes in the reactants charging sequence. Specifically, initiator 5,11,17,23,29,35,41,47-(2-hydroxypropyl)-49,50,51,52,53,54,55,56-octamethoxycalix[8]arene, 0.0516 g (3.6×10⁻⁵ mol), was suspended in 8 mL CH₃Cl, and then BCl₃, 0.68 mL (0.32M), was added. The charge aged 5 minutes, then DMA (1.98×10⁻²M) and DtBP (4.97×10⁻³M) were added, and after 10 minutes, 1.5 mL (33% of the required amount) isobutylene was added to start the polymerization. After 2 hours, 14 mL hexanes, TiCl₄ (4.97×10⁻²M), and the remaining amount of isobutylene (2.5 mL) were added. After one hour the polymerization was terminated with prechilled methanol and the product worked-up as described above. As shown in FIG. 8, GPC analysis showed the presence of two major products: Star polymer ~70% and a side product ~30%. The star polymer was isolated from the mixture by fractionation using hexanes as the solvent and acetone as the precipitating agent.

In a similar polymerization using a 5,11,17,23,29,35,41,47-(2-methoxypropyl)-49,50,51,52,53,54,55,56-octamethoxycalix[8]arene/BCl₃—TiCl₄ initiating system instead of the 5,11,17,23,29,35,41,47-(2-hydroxypropyl)-49,50,51,52,53,54,55,56-octamethoxycalix[8]arene/BCl₃—TiCl₄ initiating system, the two-stage procedure was again carried out, except by the use of initiator 5,11,17,23,29,35,41,47-(2-methoxypropyl)-49,50,51,52,53,54,55,56-octamethoxycalix[8]arene. Different polymerizations conditions were employed in order to optimize the product. Representative examples are described.

Example 1

Figure 9:
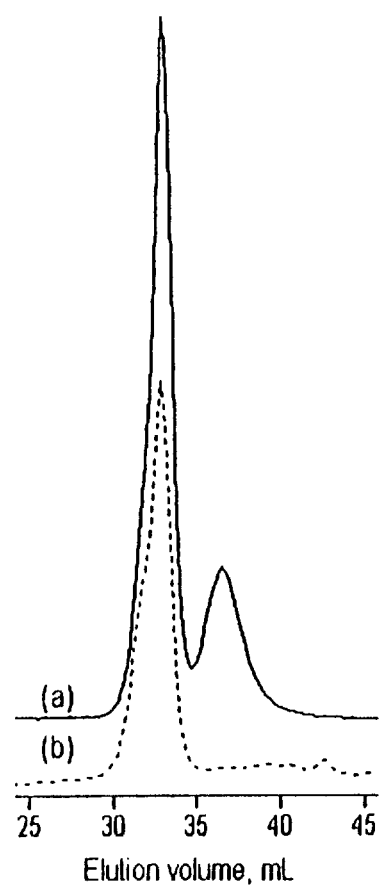
FIG. 9 is a set of gel permeation chromatograms of (a) a RI trace, and (b) a UV trace, of polymers obtained by using the 5,11,17,23,29,35,41,47-(2-methoxypropyl)-49,50,51,52,53,54,55,56-octamethoxycalix[8]arene/BCl$_3$—TiCl$_4$ initiating system under the conditions set forth in Example 1 hereinbelow.

Initiator 5,11,17,23,29,35,41,47-(2-methoxypropyl)-49,50,51,52,53,54,55,56-octamethoxycalix[8]arene, 8.41×10⁻² g (5.402×10⁻⁵ mol), was placed into a 75 mL culture tube. In the first stage, the charge contained 10 mL CH₃Cl, DMA (5.57×10⁻²M), DtBP (1.452×10⁻²M), 2 mL isobutylene and the polymerization was induced by the addition of BCl₃ (4.45×10⁻¹M) at 80° C. After 60 minutes, 15 mL hexanes, TiCl₄ (6.97×10⁻²M) and 4 mL isobutylene were added. After 45 minutes, the polymerization was terminated using pre-chilled methanol and the product was purified as described above. Conversion was ~100%. As shown in FIG. 9, GPC analysis showed two major products—a star polymer, ~74%, and a side product, ~26%.

Example 2

Initiator 5,11,17,23,29,35,41,47-(2-methoxypropyl)-49,50,51,52,53,54,55,56-octamethoxycalix[8]arene, 8.45×10⁻² g (5.402×10⁻⁵ mol), was placed in a 75 mL culture tube. In the first stage, the charge contained 10 mL CH₃Cl, DMA (5.57×10⁻²M), DtBP (1.03×10⁻²M), 2 mL isobutylene, and the polymerization was induced by the addition of BCl₃ (2.23×10⁻¹M). After 60 minutes, 15 mL hexanes, TiCl₄ (6.97×10⁻²M), and 4 mL isobutylene were added. After 45 minutes, the polymerization was quenched by pre-chilled methanol and the polymer purified as described above. The conversion was ~100%. GPC analysis showed two major products—a star polymer, ~80%, and a side product, ~20%.

Example 3

Initiator 5,11,17,23,29,35,41,47-(2-methoxypropyl)-49,50,51,52,53,54,55,56-octamethoxycalix[8]arene, 5.53×10⁻² g (3.60×10⁻⁵ mol), was placed in a 75 mL culture tube. In the first stage, the charge contained 10 mL CH₃Cl, DMA (3.97×10⁻²M), DtBP (1.03×10⁻²M), 1 mL isobutylene, and the polymerization was induced by the addition of BCl₃ (4.97×10⁻²M). After 60 minutes, 15 mL hexanes, TiCl₄ (4.97×10⁻²M), and 2 mL isobutylene were added. After 50 minutes, the polymerization was quenched by pre-chilled methanol and the polymer was purified as described earlier. Conversion was ~100%. GPC analysis showed the presence of two major products—a star polymer, ~85%, and a side product, ~15%.

Example 4

Figure 10:
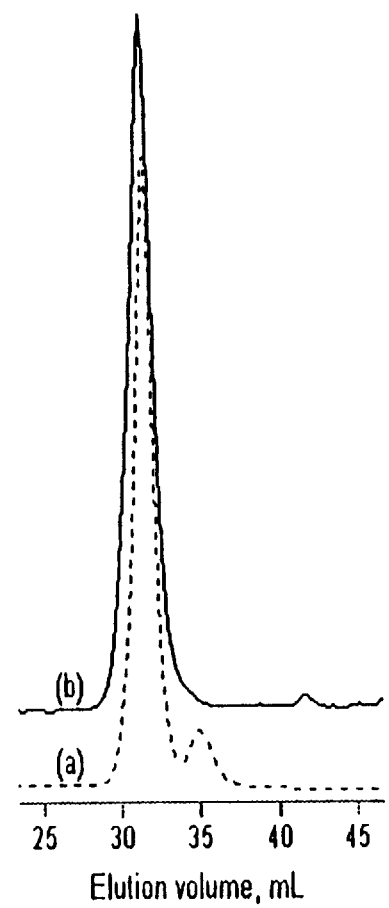
FIG. 10 is a set of gel permeation chromatograms of (a) a RI trace, and (b) a UV trace, of polymers obtained by using the 5,11,17,23,29,35,41,47-(2-methoxypropyl)-49,50,51,52,53,54,55,56-octamethoxycalix[8]arene/BCl$_3$—TiCl$_4$ initiating system under the conditions set forth in Example 4 hereinbelow.

Initiator 5,11,17,23,29,35,41,47-(2-methoxypropyl)-49,50,51,52,53,54,55,56-octamethoxycalix[8]arene, 4.81×10⁻⁵ mol), was placed in a 75 mL culture tube. In the first stage, the charge contained 10 mL CH$_3$Cl, DMA (1.99×10$^{-2}$M), DtBP (1.03×10$^{-2}$M), 1 mL isobutylene, and the polymerization was induced by the addition of BCl$_3$ (2.60×10$^{-2}$M). After 60 minutes, 15 mL hexanes, TiCl$_4$ (7.94×10$^{-2}$M) and 3.4 mL isobutylene were added. After 45 minutes, the polymerization was quenched by pre-chilled methanol and the polymer was purified as described earlier. Conversion was ~100%. As shown in FIG. 10, GPC analysis showed two major products—a star polymer, ~90%, and a side product, ~10%. Pure star polymer was obtained by fractionation by using hexanes as solvent and acetone as precipitating agent.

intermolecularly attack growing carbocations and thus produce permanent gel:

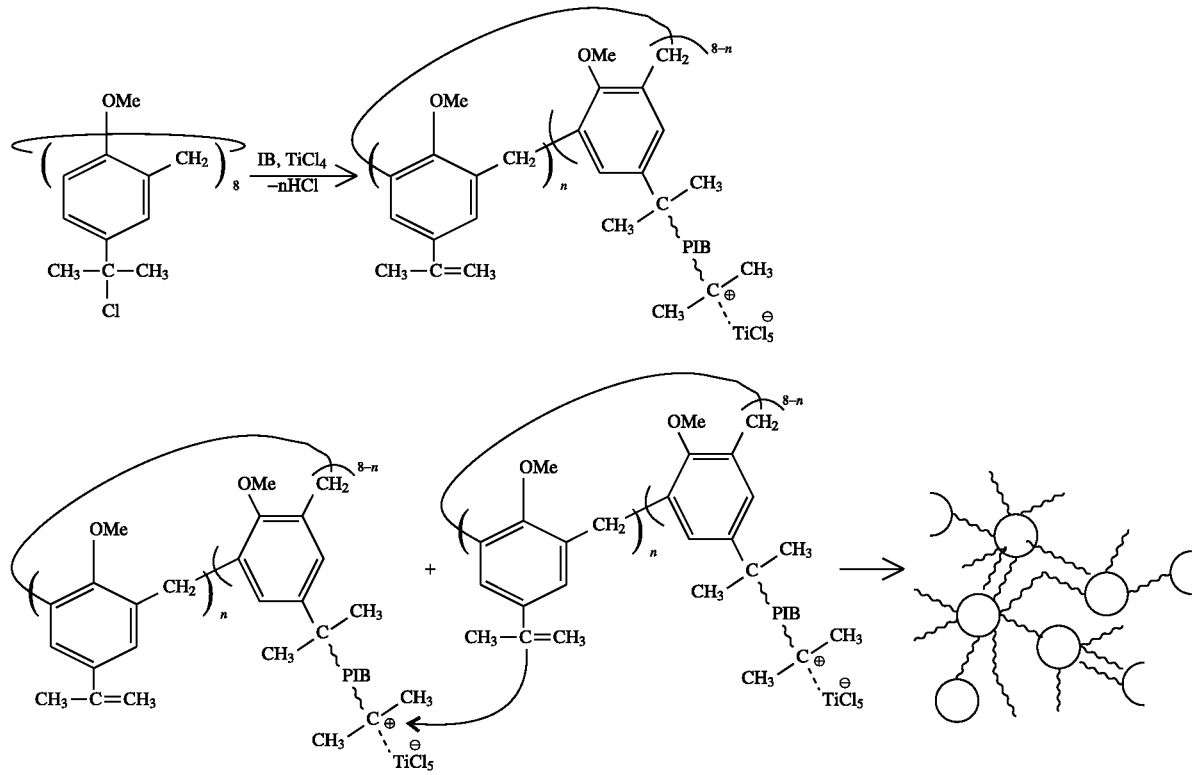

Example 5

Figure 11:
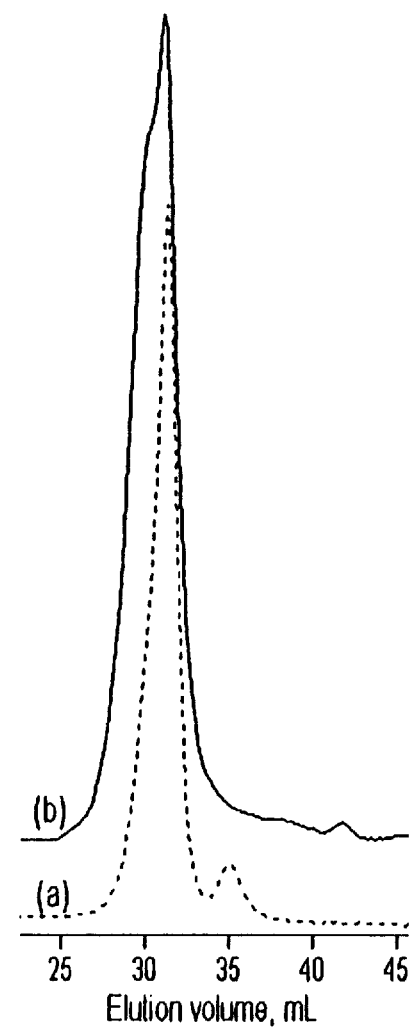
FIG. 11 is a set of gel permeation chromatograms of (a) a RI trace, and (b) a UV trace, of polymers obtained by using the 5,11,17,23,29,35,41,47-(2-methoxypropyl)-49,50,51,52,53,54,55,56-octamethoxycalix[8]arene/BCl$_3$—TiCl$_4$ initiating system under the conditions set forth in Example 5 hereinbelow.

Initiator 5,11,17,23,29,35,41,47-(2-methoxypropyl)-49,50,51,52,53,54,55,56-octamethoxycalix[8]arene, 4.85×10$^{-2}$ g (3.15×10$^{-5}$ mol) was placed in a 75 mL culture tube. The charge contained 10 mL CH$_3$Cl, 15 mL hexanes, DMA (1.99×10$^{-2}$M), DtBP (1.03×10$^{-2}$M), 4.4 mL isobutylene, and the polymerization was induced by the simultaneous addition of BCl$_3$ (2.60×10$^{-2}$M) and TiCl$_4$ (7.94×10$^{-2}$M). After 45 minutes, the polymerization was quenched by pre-chilled methanol and the polymer was purified as described above. Conversion was ~100%. As shown in FIG. 11, GPC analysis showed the presence of two products—a star polymer, ~94%, and a side product, ~6%.

Three other examples used the 5,11,17,23,29,35,41,47-(2-methoxypropyl)-49,50,51,52,53,54,55,56-octamethoxycalix[8]arene/TiCl$_4$ initiating system. However, insoluble gels formed with 100% conversion for two of the examples and, for the third, gel formation was observed with 85% conversion. The scheme outlined hereinbelow is a possible route towards gel formation. Specifically, reactive p-isopropenyl groups (which may arise by loss of HCl of labile tert-chlorine intermediates) may However, it is believed that this initiating system will provide the desired results under different conditions.

Also, it is noted that initial attempts were made with the octafunctional initiator 5,11,17,23,29,35,41,47-(2-hydroxypropyl)-49,50,51,52,53,54,55,56-octamethoxycalix[8]arene, to polymerize isobutylene by the two stage process described above, however, this derivative was insufficiently soluble in CH$_3$Cl at −80° C. It was thought that the exchange product of 5,11,17,23,29,35,41,47-(2-hydroxypropyl)-49,50,51,52,53,54,55,56-octamethoxycalix[8]arene with BCl$_3$, the tert-chlorine derivative, (see Scheme 3), would be soluble in the charge under these conditions. Thus, 5,11,17,23,29,35,41,47-(2-hydroxypropyl)-49,50,51,52,53,54,55,56-octamethoxycalix[8]arene was contacted with BCl$_3$ for 15 minutes in CH$_3$Cl before the first monomer addition. Subsequently, we added hexanes, TiCl$_4$ and the remaining monomer. By this technique, gratifyingly, the conversion was found to be close to 100%.

The RI and UV (GPC) traces of the product, as shown in FIG. 8, showed two peaks—one at a relatively high molecular weight (~32 mL) which was sensitive to both RI and UV, and a second peak (~37 mL, ~30% by RI) which was only RI sensitive. This implies that the peak at high molecular weight was due to the product formed by purposeful initiation and that the second was formed by chain transfer, halometallation and/or protic impurities. Both products showed relatively narrow molecular weight distributions, $\overline{M}_w/\overline{M}_n$=1.14 and 1.2, respectively, indicating controlled polymerizations. The star polymer was isolated from the mixture by fractionation using hexanes solvent and acetone as the precipitating agent. Molecular weights of polymers are not reported because for these preliminary, RI and UV (GPC) analyses linear calibration plots were used which do not give correct values for the star polymers. Since these results were not promising as the prior experiments conducted using the tert-ether derivative 5,11,17,23,29,35,41, 47-(2-methoxypropyl)-49,50,51,52,53,54,55,56-octamethoxycalix[8]arene as initiator, which was completely soluble in CH₃Cl at −80° C., these reactions were further investigated.

Again, the following scheme set forth the reactions as carried out in two stages: The first stage was induced by the addition of BCl₃ to a solution of initiator, partial amount of IB (~30%) and other additives in CH₃Cl, and polymerizing for 90 minutes. Then the polymerization was continued by the addition of hexanes, TiCl₄ and the remaining IB and stirring occasionally for 60 minutes. Quenching by methanol resulted in the formation of PIB arms with tertiary chlorine end groups. After purification the conversion was close to 100%. FIG. 9 shows the GPC trace of the products, two narrow dispersity peaks. The amount of the linear by-product was ~26%.

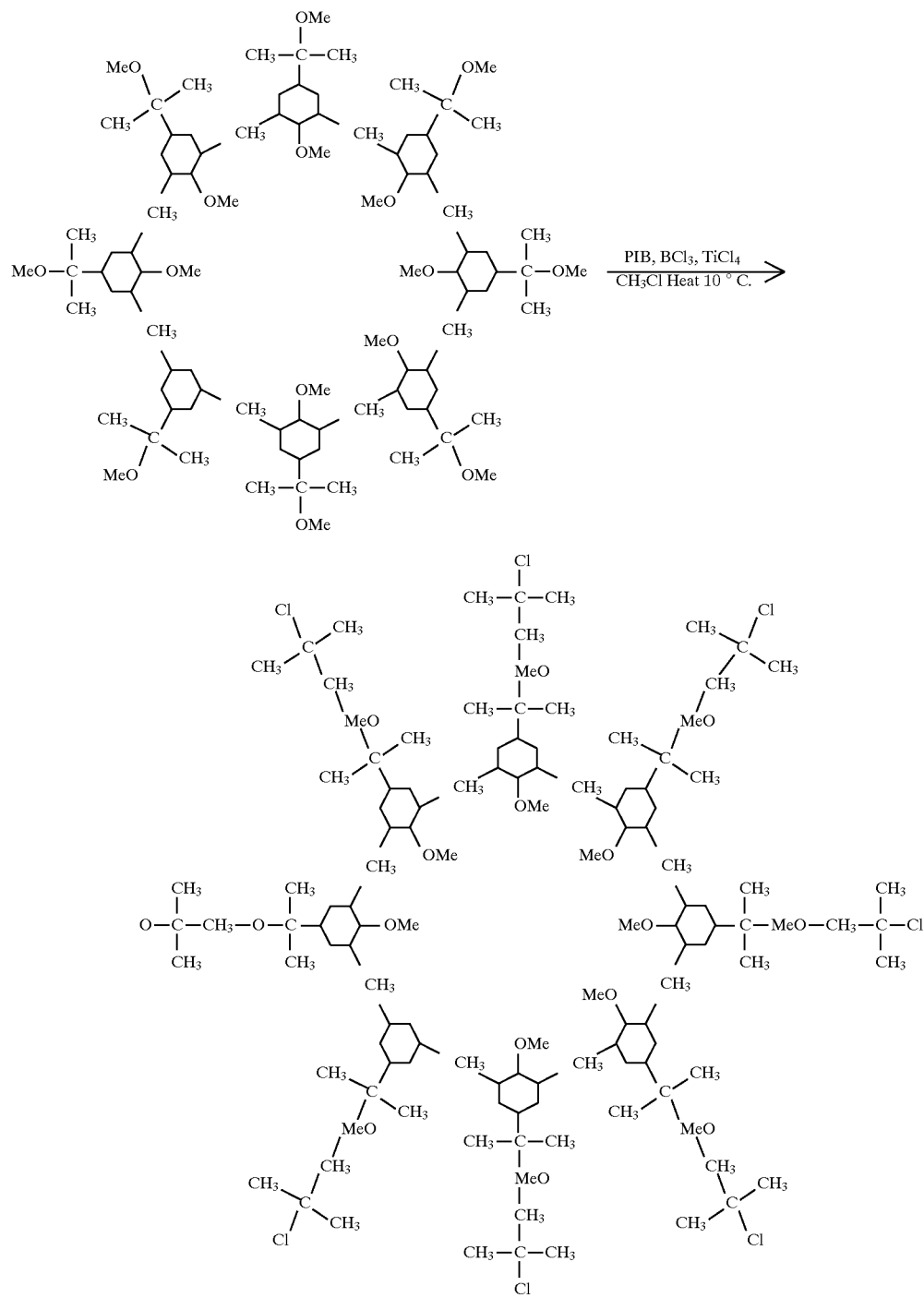

A detailed investigation of polymerization conditions was carried out to gain insight into the formation of undesirable linear low molecular weight by-product. Possible reactions that may lead to the formation of linear polymers are uncontrolled protic-impurities($H_2O$)-induced polymerization, chain transfer, and halometallation. The first two possibilities can most likely be excluded because of the conditions used, i.e., presence of DtBP and use of carefully dried initiator. It was surprising to observe that control experiments in the absence of initiator under these conditions with mixed $BCl_3/TiCl_4$ gave 100% conversion and narrow dispersity product. Prior experiments with only $BCl_3$ or only $TiCl_4$ gave traces of product or less than 10% conversion respectively. These observations suggested haloboration to be the major side reaction. This conclusion prompted a thorough investigation of the effect of $BCl_3$, monomer, first stage reaction time, mode of addition of the coinitiators (whether added simultaneously or separately) and $TiCl_4$ on the molecular weight and conversion. In most cases, in both the presence of both $BCl_3$ and $TiCl_4$ and in the absence of initiator, conversions were ~100%. From these control experiments, it was found that changing $TiCl_4$ does not have much influence rather than changing the rate of polymerization, whereas changing $BCl_3$, monomer, and/or increasing the time of reaction in the first stage, decreased the molecular weight of the composition. Based on these results, it is believed that the adduct formed by haloboration of isobutylene is the most likely initiating species in side reactions. When $TiCl_4$ is added, rapid polymerization ensues as shown in the scheme hereinbelow. With only $BCl_3$, the reaction is limited to haloboration under the $BCl_3$ concentrations studied (equation 2 of the scheme), and the amount of the adduct depends on $BCl_3$, monomer and first stage reaction time.

$BCl_3$ alone, conversions and molecular weights are usually low. In contrast, for the present invention, high conversions and high molecular weights at moderate concentrations of $BCl_3$ and $TiCl_4$, have been unexpectedly found, particularly where the two Friedel-Crafts halides are used in two stages. The process of using two coinitiators in moderate concentrations in two stages, to obtain PIB, in the absence of initiator with high molecular weights, narrow distribution and high conversions is believed novel.

Based on these results, experiments were further carried out with different $BCl_3$, lower amount of monomer (25%) and shorter reaction times (30–60 minutes) in conjunction with 5,11,17,23,29,35,41,47-(2-methoxypropyl)-49,50,51, 52,53,54,55,56-octamethoxycalix[8]arene in the first stage of the process. As can be seen in Table I hereinbelow, it was found that as the $BCl_3$ is decreased, the relative amount of the low molecular weight product decreases. Furthermore, when a only a little $BCl_3$ (0.026M) was used, the amount of the linear UV-inactive polymers was reduced to ~10%, as shown in FIG. 10.

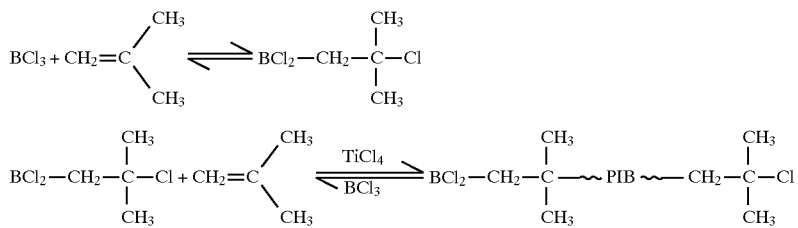

It is known that isobutylene polymerization via haloboration occurs only at very high concentrations of $BCl_3$. With

TABLE I

Results of isobutylene polymerization by the use of 5,11,17,23,29,35,41,47-(2-methoxypropyl)-49,50,51,52,53,54,55,56-octamethoxycalix[8]arene as initiator at different condition

| Expt No. Example No. | $[BCl_3] \times 10^2$ M | $[TiCl_4] \times 10^2$ M | Relative Amounts* | | Star $\bar{M}_w/\bar{M}_n$ | Comments |
|---|---|---|---|---|---|---|
| | | | Star | Linear | | |
| 6-25 Example 1 | 47.50 | 7.45 | 74 | 26 | 1.13 | $BCl_3$ and $TiCl_4$ added separately |
| 7-27 Example 2 | 23.80 | 7.45 | 80 | 20 | 1.14 | $BCl_3$ and $TiCl_4$ added separately |
| 8-19 | 9.90 | 4.97 | 81 | 19 | 1.14 | $BCl_3$ and $TiCl_4$ added separately |
| 8-20 Example 3 | 4.97 | 7.94 | 85 | 15 | 1.15 | $BCl_3$ and $TiCl_4$ added separately |
| 9-7 | 2.60 | 7.94 | 90 | 10 | 1.12 | $BCl_3$ and $TiCl_4$ added |

TABLE I-continued

Results of isobutylene polymerization by the use of 5,11,17,23,29,35,41,47-(2-methoxypropyl)-49,50,51,52,53,54,55,56-octamethoxycalix[8]arene as initiator at different condition

| Expt No. Example No. | $[BCl_3] \times 10^2$ M | $[TiCl_4] \times 10^2$ M | Relative Amounts* Star | Linear | Star $\bar{M}_w/\bar{M}_n$ | Comments |
|---|---|---|---|---|---|---|
| Example 4 | | | | | | separately |
| 9-8 | 2.60 | 7.94 | 94 | 6 | 1.15 | $BCl_3$ and $TiCl_4$ added |
| Example 5 | | | | | | simultaneously |
| 9-1 | 0.993 | 7.94 | — | — | — | Gel formation |
| 7-28 | 0.00 | 22.3 | — | — | — | Gel formation |
| Example 6 | | | | | | |
| 8-27 | 0.00 | 11.9 | — | — | — | Gel formation |
| 8-23 | 0.00 | 7.94 | — | — | — | Gel formation |
| Example 7 | | | | | | |
| 8-28 | 0.00 | 5.96 | — | — | — | Gel formation |
| Example 8 | | | | | | low conversion |

Still further, the RI and UV traces of the star polymers were symmetrical indicating a monodisperse product. The polydispersity of the star polymers was narrow ($\bar{M}_w/\bar{M}_n$=1.12). The small peak at 42 mL elution volume indicates unreacted initiator which escaped dissolution via the solvent. At a concentration of $BCl_3$<0.026M however, gel formation was observed. It was also found that the simultaneous addition of the coinitiators further decreases the amount of linear product as shown in FIG. 11, but its molecular weight was higher than that obtained in the prior experiments indicating lower initiator efficiency. Also, the UV trace showed the presence of some high molecular weight stars (~31 mL). Thus the two stage procedure with low concentration of $BCl_3$ is preferred over one-step simultaneous addition of coinitiators. In addition, when the two step procedure is used, slow propagation in the presence of $BCl_3$ in the first stage allows almost all the initiating sites to add a few units of isobutylene and grow rapidly in the second stage. This could also alleviate slow initiation as it simulates "seeding technique". Molecular weights of these polymers are not reported because, for these optimization studies, RI and UV (GPC) analyses linear calibration plots were used which do not give correct values for the star polymers.

Figure 12:
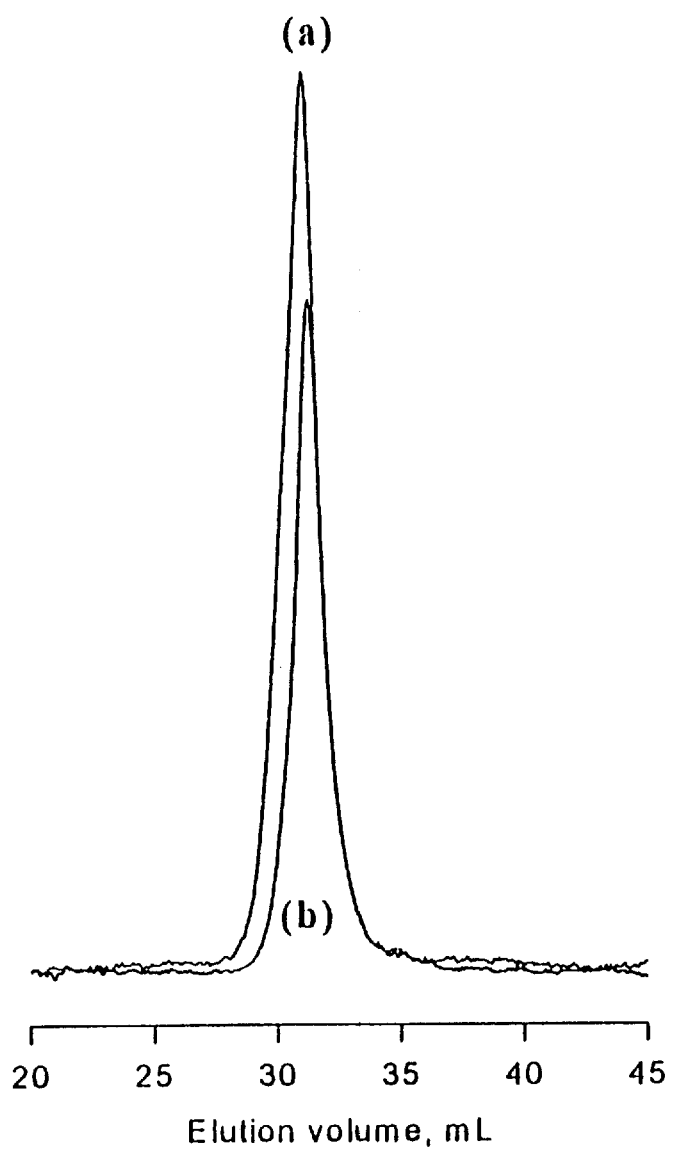
FIG. 12 is a set of gel permeation chromatograms of (a) a laser light scattering (LLS) (90°) trace, and (b) a RI (Optilab 903) trace of the resultant star polymer from Example 4 after fractionation.

These studies have indicated that monodisperse star polymers with minimum side products can be obtained by the two-stage procedure. Star polymer was fractionated from the mixture using hexanes solvent and acetone as the precipitating agent. Star polymers thus obtained were used for determining the molecular weights by light scattering. FIG. 12 shows the pertinent gel permeation chromatograms. The LLS (90°) trace and the RI, (Optilab-903) trace indicate monomodal star polymers. The slight shift of the LLS peak toward higher molecular weights is due to the relatively greater scattering by high molecular weight stars. The dn/dc of the stars were found to be 0.118±8.4×10⁻⁴ cm³/g. The number average molecular weight, $\bar{M}_n$, weight average molecular weight, $\bar{M}_w$, and polydispersity index, $\bar{M}_w/\bar{M}_n$, were 1.048±0.02×10⁵ g/mol, 1.159±0.02×10⁵ g/mol, and 1.11 respectively. The observed molecular weights, $\bar{M}n_{obsd}$=13,000 g/mol per arm were slightly higher than the theoretical value ($\bar{M}n_{theor.}$=11500 g/mol per arm; $\bar{M}n_{theor.}$ calculated after correction for side-product) which may be due to a less than 100% initiation efficiency and/or overestimation of $\bar{M}n$ by light scattering.

To determine the number of arms of the resultant stars and as noted hereinabove, NMR spectra were prepared, and elemental analysis indicated eight potential sites for initiation in 5,11,17,23,29,35,41,47-(2-methoxypropyl)-49,50,51, 52,53,54,55,56-octamethoxycalix[8]arene. To verify the expectation that 8 tert-methoxy groups, in fact, give rise to eight PIB arms, the product of a representative experiment (Example 4) after fractionation was subjected to core destruction (see description hereinabove). The methodology has repeatedly been used in laboratory studies to determine the number of arms of star polymers having aromatic cores. By this core destruction method, the aromatic moieties are selectively destroyed by exhaustive oxidation whereas the saturated aliphatic polymer arms resist oxidation and can be quantitated by GPC. It was found that the core was destroyed after 16 hours—single peak by GPC analysis. Control experiments under similar conditions showed that calixarenes underwent oxidation to form low molecular weight products (by GPC) where as linear PIB survived oxidation. The following scheme is presented for review and understanding.

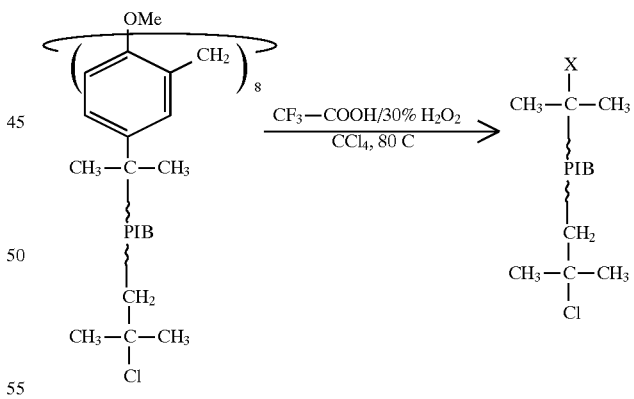

where X are unidentified groups.

Figure 13:
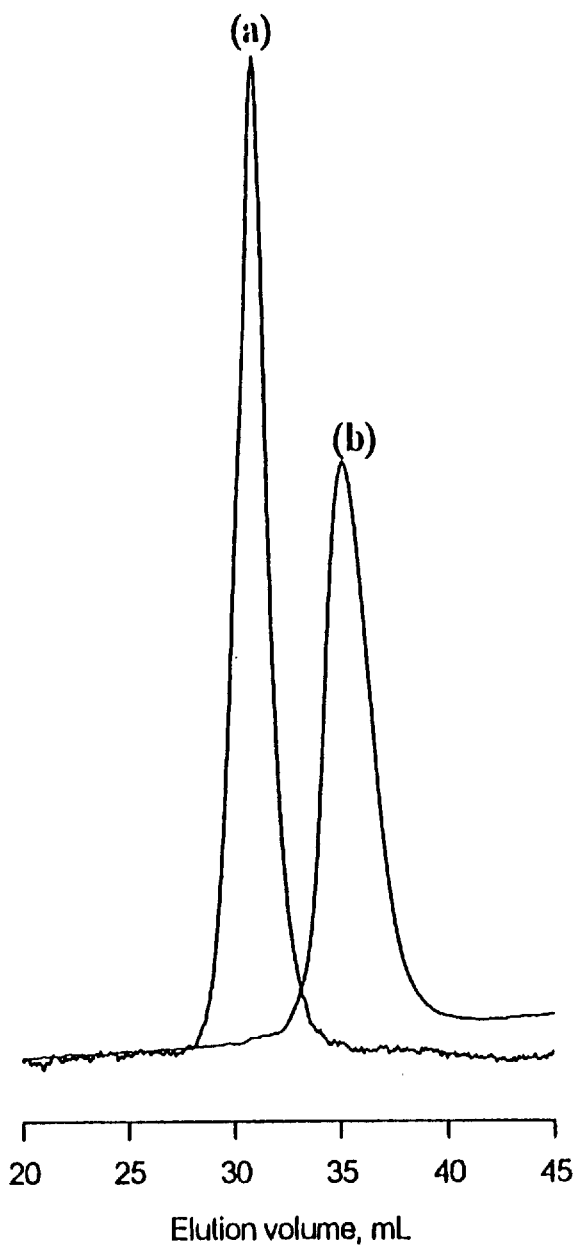
FIG. 13 is a set of gel permeation chromatograms of RI traces, (a) before core destruction and (b) after core destruction of the star polymers from Example 4.

The molecular weight of the arms that survived oxidation was determined by LLS (GPC) and are shown in FIG. 13. The dn/dc of surviving arms was found to be 0.107 cm³/g. The $\bar{M}_n$, $\bar{M}_w$ and dispersity were 1.366±0.09×10⁴ g/mol, 1.496±0.09×10⁴ g/mol and $\bar{M}_w/\bar{M}_n$=1.23 respectively. The distribution of the arms after core destruction was slightly broader than the stars which may be due to slow initiation and/or incomplete oxidation of the cores. The number average number of arms, $\bar{N}_n$, and weight average number of arms, $\bar{N}_w$, are: $\bar{N}_n$=1.048±0.02×10⁵ g/mol /1.366±0.09×10⁴ g/mol=7.7 and $\overline{N}_w$=1.159±0.02×10$^5$ g/mol/1.496±0.09×10$^4$ g/mol=7.8 respectively. The number of arms were found to be slightly lower than theoretical (i.e., 8.0) which may be due to incomplete initiation and/or incomplete oxidation of the cores.

In continuation of these experiments, various thermoplastic elastomers were prepared by the addition of aromatic (styrene) monomer to the polyisobutylene stars prepared hereinabove. That is, thermoplastic elastomers (TPEs) comprising poly(styrene-b-isobutylene) (PSt-b-PIB) arms emanating from a calixarene core were prepared using the "core first" method. In the following examples, the octa-functional calix[n]arene (n=8) initiator was used to initiate the polymerization of isobutylene to various desirable molecular weights, and styrene monomer was subsequently added to form the desired block-arm stars. More particularly, living PIB segments were "grown" from the core by the IMA technique and the polystyrene (PSt) block segment was obtained by sequential monomer addition to the "living" PIB+ arms. The following scheme illustrates the steps and structures involved.

Scheme 1

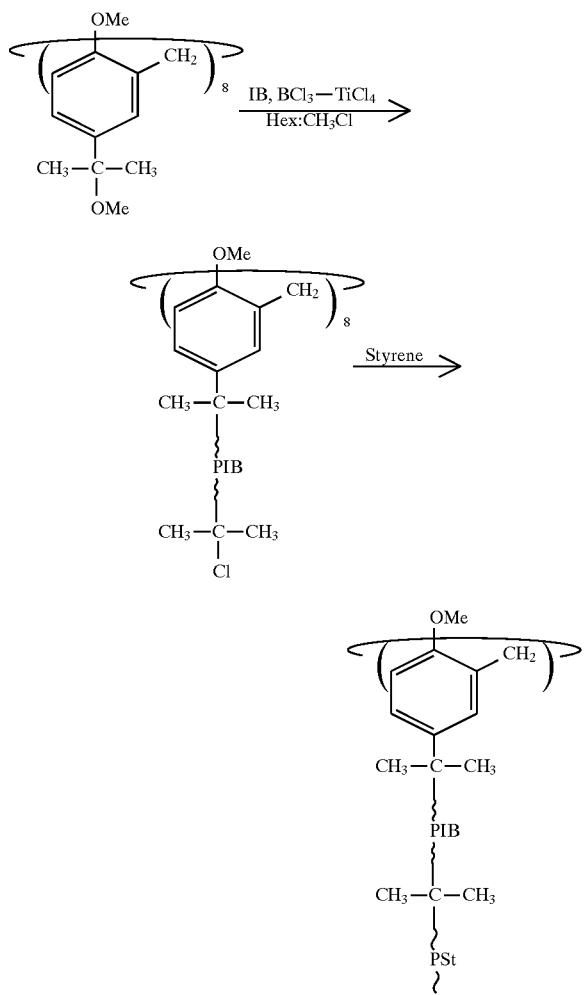

In the course of these experiments, the same materials were used as were specified hereinabove concerning the synthesis of stars comprising calix[8]arene core and PIB arms. The synthesis and characterization of the calixarene initiator has already been described. Methylcyclohexane (Aldrich) was refluxed over night in the presence of CaH$_2$ and distilled before use. Styrene (Aldrich) and para-chlorostyrene (99%) (Lancaster) were purified by passing these monomers through inhibitor remover columns before use.

The synthesis was substantially similar to that used hereinabove. Polymerizations were carried out in 300 mL stirred reactors in a glove box at −80° C. Isobutylene was polymerized by incremental monomer addition (IMA) to predetermined molecular weights and after reaching at least 95% conversion, styrene was added and polymerized for a predetermined time to get star block copolymers with varying polystyrene (PSt) compositions. Samples, in amounts ranging from about 0.5 mL to 1 mL, were withdrawn to follow conversions and molecular weight build up.

Example 9

Initiator 5,11,17,23,29,35,41,47-(2-methoxypropyl)-49,50,51,52,53,54,55,56-octamethoxycalix[8]arene, 4.91×10$^{-2}$ g (3.19×10$^{-5}$ mol) was dissolved in CH$_3$Cl (10 mL), then, in sequence, isobutylene (1 mL), DMA (0.05 mL, 5.76×10$^{-4}$ mol), and DtBP (0.07 mL, 3.0×10$^{-4}$ mol) were added, and the polymerization was induced by the addition of BCl$_3$ (0.06 mL, 8.64×10$^{-4}$ mol) at −80° C. After 60 minutes, 15 mL methylcyclohexane and 3.2 mL isobutylene were added and the polymerization was continued by the addition of TiCl$_4$ (0.25 mL, 2.304×10$^{-3}$ mol). After 80 minutes of total reaction time a mixture of methylcyclohexane (9 mL), CH$_3$Cl (6 mL) and isobutylene (4.2 mL) was added followed by TiCl$_4$ (0.15 mL, 1.38×10$^{-3}$ mol). After 110 minutes a mixture of methylcyclohexane (21 mL) and CH$_3$Cl (14 mL), and styrene (6.34 mL) was added and a further amount of TiCl$_4$ (0.15 mL, 1.38×10$^{-3}$ mol) was introduced. After 140 minutes the polymerization was quenched by the use of prechilled methanol. The product was washed with 5% HCl, water, and methanol, and the volatiles removed by evaporation. It was purified by dissolving in THF and reprecipitating from methanol and dried in vacuo at room temperature. Gel permeation chromatography (GPC) and $^1$H NMR spectroscopy indicated the presence of ~46 wt % of polystyrene in the star-block product.

Example 10

Initiator 5,11,17,23,29,35,41,47-(2-methoxypropyl)-49,50,51,52,53,54,55,56-octamethoxycalix[8]arene, (4.91×10$^{-2}$ g, 3.19×10$^{-5}$ mol) was dissolved in CH$_3$Cl (10 mL), then, in sequence, isobutylene (1 mL), DMA (0.05 mL, 5.76×10$^{-4}$ mol), and DtBP (0.07 mL, 3.0×10$^{-4}$ mol) were added, and the polymerization was induced by the addition of BCl$_3$ (0.06 mL, 8.64×10$^{-4}$ mol) at −80° C. After 60 minutes, 15 mL methylcyclohexane and 3.2 mL isobutylene were added and the polymerization was continued by the addition of TiCl$_4$ (0.25 mL, 2.304×10$^{-3}$ mol). After 80 minutes and after 110 minutes of total reaction time, a mixture of methylcyclohexane (9 mL), CH$_3$Cl (6 mL) and isobutylene (4.2 mL) was added followed by TiCl$_4$ (0.15 mL, 1.38×10$^{-3}$ mol). After 140 minutes a mixture of methylcyclohexane (21 mL) and CH$_3$Cl (14 mL), and styrene (6.34 mL) was added, and a further amount of TiCl$_4$ (0.15 mL, 1.38×10$^{-3}$ mol) was introduced. After 155 minutes the polymerization was quenched by the use of prechilled methanol. The product was washed with 5% HCl, water, and methanol, and the volatiles removed by evaporation. It was purified by dissolving in THF and reprecipitating from methanol and dried in vacuo at room temperature. Gel permeation chromatography (GPC) and $^1$H NMR spectroscopy indicated the presence of ~17 wt % of polystyrene in the star-block product.

Example 11

Initiator 5,11,17,23,29,35,41,47-(2-methoxypropyl)-49, 50,5 1,52,53,54,55,56-octamethoxycalix[8]arene, (4.91× $10^{-2}$ g, 3.19×$10^{-5}$ mol) was dissolved in $CH_3Cl$ (10 mL), then, in sequence, isobutylene (1 mL), DMA (0.05 mL, 5.76×$10^{-4}$ mol), and DtBP (0.07 mL, 3.0×$10^{-4}$ mol) were added, and the polymerization was induced by the addition of $BCl_3$ (0.06 mL, 8.64×$10^{-4}$ mol) at −80° C. After 60 minutes, 15 mL methylcyclohexane and 3.2 mL isobutylene were added, and the polymerization was continued by the addition of $TiCl_4$ (0.25 mL, 2.304×$10^{-3}$ mol). After 80 minutes and after 110 minutes of total reaction time, a mixture of methylcyclohexane (9 mL), $CH_3Cl$ (6 mL) and isobutylene (4.2 mL) was added followed by $TiCl_4$ (0.15 mL, 1.38×$10^{-3}$ mol). After 140 minutes, a mixture of methylcyclohexane (21 mL) and $CH_3Cl$ (14 mL), and styrene (6.34 mL) as added, and a further amount of $TiCl_4$ (0.15 mL, 1.38×$10^{-3}$ mol) was introduced. After 170 minutes, the polymerization was quenched by the use of prechilled methanol. The product was washed with 5% HCl, water, and methanol, and the volatiles removed by evaporation. It was purified by dissolving in THF and reprecipitating from methanol and dried in vacuo at room temperature. Gel permeation chromatography (GPC) and $_1$H NMR spectroscopy indicated the presence of ~32 wt % of polystyrene in the star-block product.

Example 12

Initiator 5,11,17,23,29,35,41,47-(2-methoxypropyl)-49, 50,51,52,53,54,55,56-octamethoxycalix[8]arene, (4.91× $10^{-2}$ g, 3.19×$10^{-5}$ mol) was dissolved in $CH_3Cl$ (10 mL), then, in sequence, isobutylene (1 mL), DMA (0.05 mL, 5.76×$10^{-4}$ mol), and DtBP (0.07 mL, 3.0×$10^{-4}$ mol) were added, and the polymerization was induced by the addition of $BCl_3$ (0.06 mL, 8.64×$10^{-4}$ mol) at −80° C. After 80, 110, and 140 minutes of total reaction time, a mixture of methylcyclohexane (9 mL), $CH_3Cl$ (6 mL) and isobutylene (4.2 mL) was added followed by $TiCl_4$ (0.15 mL, 1.38×$10^{-3}$ mol). After 170 minutes a mixture of methylcyclohexane (21 mL) and $CH_3Cl$ (14 mL), and styrene (6.34 mL) was added and a further amount of $TiCl_4$ (0.15 mL, 1.38×$10^{-3}$ mol) as introduced. After 210 minutes the polymerization was quenched by the use of prechilled methanol. The product was washed with 5% HCl, water, and methanol, and the volatiles removed by evaporation. It was purified by dissolving in THF and reprecipitating from methanol and dried in vacuo at room temperature. Gel permeation chromatography (GPC) and $^1$H NMR spectroscopy indicated the presence of ~21 wt % of polystyrene in the star-block product.

$^1$H NMR (~10 mg star-blocks in ~0.7 mL $CDCl_3$) were recorded by a Varian Gemini-200 spectrometer using standard 5 mm tubes at room temperature. For $^1$H NMR spectroscopy 64 FIDs were collected. Molecular weights were determined by GPC (Waters Co.) equipped with a series of five $\mu$-Styragel columns (100, 500, $10^3$, $10^4$, and $10^5$), RI detector (Waters 410 Differential Refractometer), UV detector (440) Absorbance Detector), and a laser light scattering (LLS) detector (Wyatt Technology). The columns were calibrated using narrow molecular weight PIB standards. Approximately 20 mg of polymer and a few crystals of sulfur (internal standard) were dissolved in 4 mL THF, the solution was filtered by using a 0.2 $\mu$m Acrodisc filter (membrane type PTFE), and 100 $\mu$L samples were injected by the auto injector. Nelson Analytical Gel Permeation Chromatograph Software (version 4.0) was used for data analysis.

The dn/dc values were obtained by using an Optilab 903 (Wyatt Technology) instrument. Polymers were dissolved in THF prefiltered by 0.025 $\mu$m Whatman Anotop 25 filters. The solutions were filtered using 0.2 $\mu$m Acrodisc filters (membrane type PTFE), evaporated to dryness in air under dust-free conditions, and further dried under vacuum. These samples were used for preparing polymer solutions of known concentrations (e.g. 1.5×$10^{-4}$ g/$\mu$L) using prefiltered THF. Polymer solutions (100 $\mu$L) were injected into the columns using the auto injector. Astra software (version 4.00, Wyatt Technology Corporation) was used for data analysis.

A Perkin-Elmer differential scanning calorimeter (DSC), Model DSC7, was used to determine the glass transition temperatures (Tg) of the polyisobutylene (PIB) and polystyrene (PSt) segments in the star-block copolymers.

Stress-strain measurements were carried out on molded films (~1 mm thickness) at room temperature by use of microdumbell shaped samples and an Instron tensile tester (model No. 1130, crosshead speed of 5 cm/min). The samples were premolded between Mylar sheets for 10 min at 162° C. at about 100000 psi, then remolded at 165° C. and 20 000 psi for 20 min, and slowly cooled (~1° C./min) to 50° C. Select samples were solvent extracted by MEK using a Soxhlet extractor before molding.

The advantage of the use of $BCl_3$ and $TiCl_4$ in two stages for the preparation of narrow distribution monomodal octaarm star PIBs using initiator 5,11,17,23,29,35,41,47-(2-methoxypropyl)-49,50,51,52,53,54,55,56-octamethoxycalix [8]arene has been described. Since $TiCl_4$ alone or high concentrations of $TiCl_4$ in presence of $BCl_3$ produces multimodal stars, the $TiCl_4$ content in the charge was increased gradually with each monomer addition keeping the overall concentrations virtually unchanged. The final $TiCl_4$ concentration in the presence of styrene was also critical for molecular weight control and for the preparation of linear (unalkylated, unbranched) polystyrene (PSt) segments. The use of too low $TiCl_4$ concentrations produces low molecular weight PSt segments, while the use of too high $TiCl_4$ concentrations results in undesirable alkylation/branching. To minimize alkylation and to obtain reasonably high molecular weight PSt blocks, moderate $TiCl_4$ concentrations (0.059M) and relatively large concentrations of styrene were used. The styrene concentration was determined by preliminary experimentation which showed that a 2–2.5 fold excess relative to the targeted molecular weight gave satisfactory results. Styrene was added after the isobutylene conversion had reached at least 95%. Molecular weight build-up was followed by withdrawing samples from the living charges and analyzing via GPC.

Figure 14:
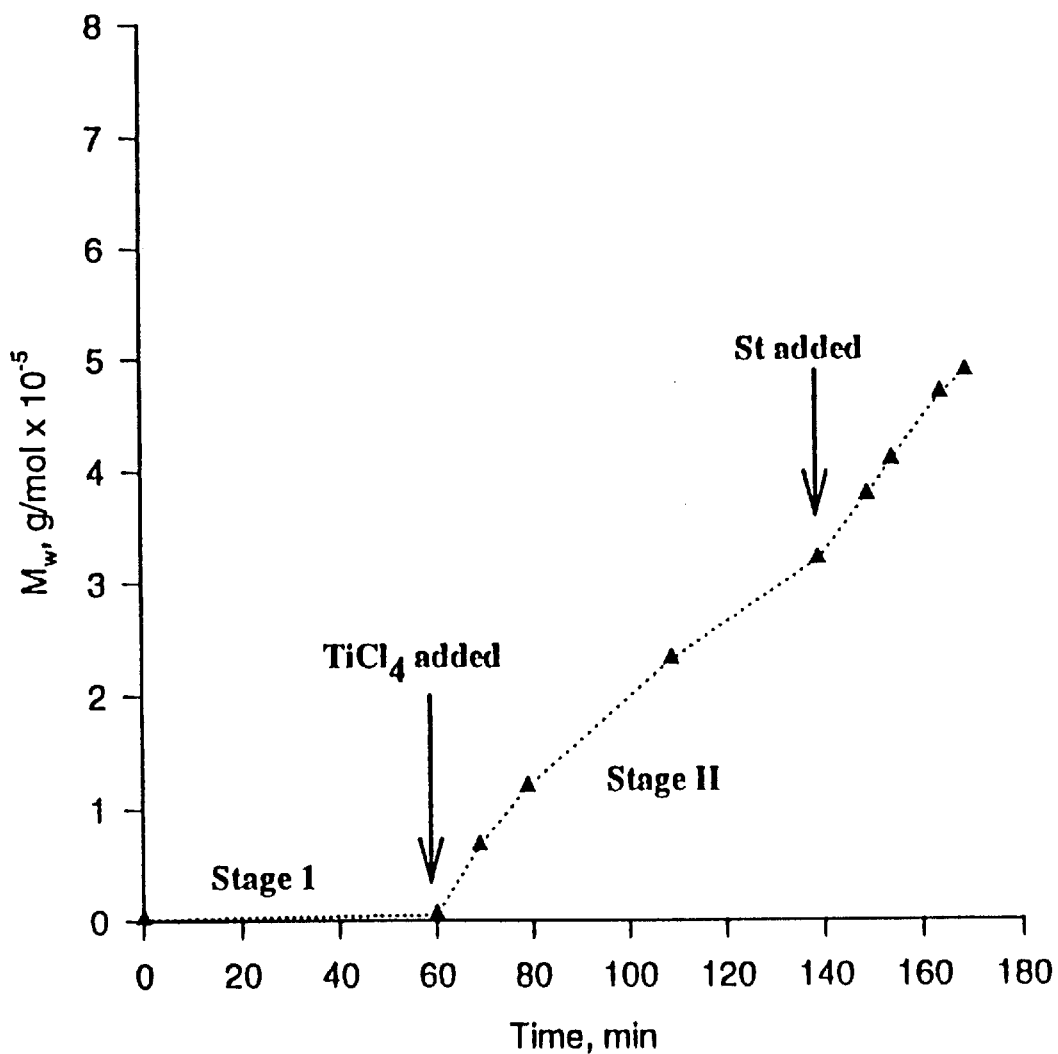
FIG. 14 is a plot of the molecular weight build-up of the block-arm (Polystyrene-b-polyisobutylene) star during its formation over time.

FIG. 14 shows the result of a representative experiment. During isobutylene polymerization in the presence of $BCl_3$ (Stage 1), only a few isobutylene units were added to the initiator and after the introduction of $TiCl_4$ the molecular weights increased as expected (Stage II). After crossing over to styrene monomer, the molecular weight increased rapidly because the rate of styrene polymerization is much higher than that of isobutylene.

Figure 15:
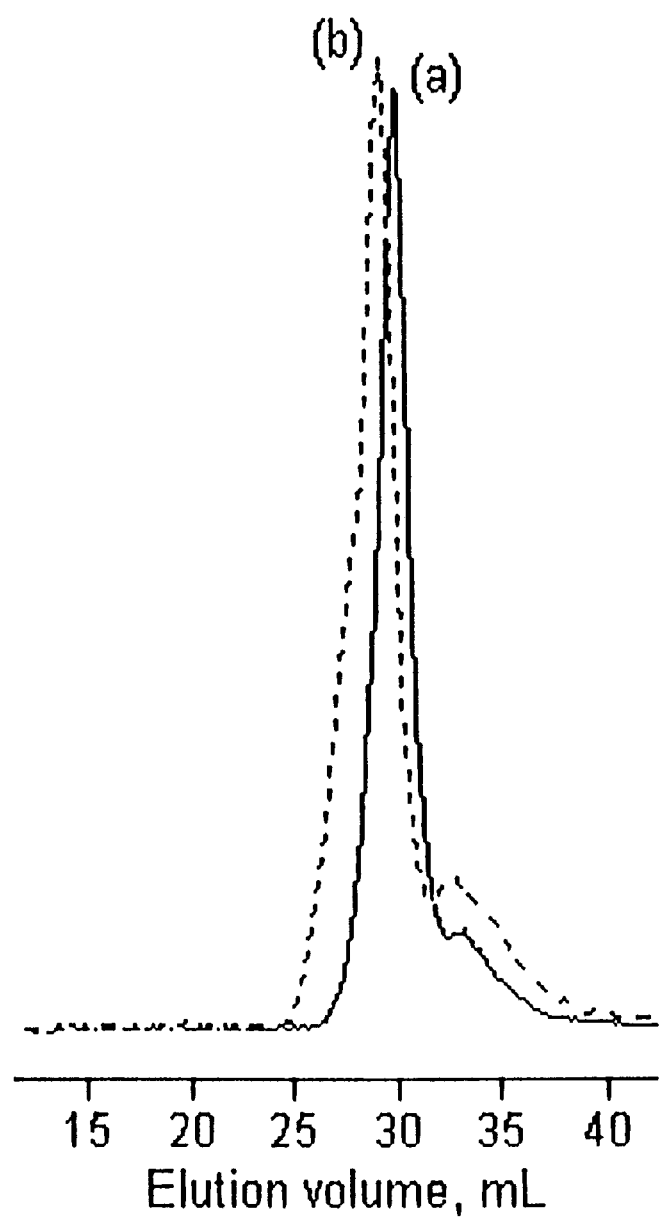
FIG. 15 is a set of gel permeation chromatograms of RI traces, (a) a homo-polyisobutylene star polymer and (b) a polystyrene-polyisobutylene star block copolymer.

FIG. 15 shows a representative GPC (RI) trace of a PIB star and the corresponding PIB-b-PSt star. Both peaks are monomodal and reflect narrow molecular weight distributions, $\overline{M}_w/\overline{M}_n$, of 1.18 and 1.23, respectively. The small peak at ~34 mL (FIG. 2, (a)) is due to linear PIB by-product, the origin of which has been explained. The small peak at ~33 mL (FIG. 2, (b)) is a mixture of linear diblocks (PIB-b-PSt) formed by the crossover of living $PIB^+$ to styrene (~10%, by RI peak area after extracting the mono-PSt by MEK) and homo-PSt (3–5%, by extraction). In the presence of higher $TiCl_4$ concentrations or with longer reaction times during the styrene polymerization stage, the GPC (RI) traces showed shoulders indicating the formation of high molecular weight stars most likely by alkylation of the pendent phenyl rings in PSt by growing $PSt^+$. At even higher $TiCl_4$ concentrations, gel formed due to extensive alkylation.

The molecular weights of the PIB stars and star-blocks were determined by triple-detector GPC. Even though the RI traces of the star-block were monomodal, the molecular weights determined by LLS were higher than expected possibly due to the presence of a small amount of higher molecular weight stars formed by alkylation. Thus, the molecular weight data of the star-blocks and PSt segments calculated from LLS data was viewed with caution.

In view of the potential presence of small amounts of alkylated products, which could have distorted the molecular weights, $^1H$ NMR spectroscopy was also used to analyze the PSt content and the molecular weight of the PSt blocks, and insure accuracy. Characteristics of select samples are shown in Table II. The $\bar{M}_n$ of PIB stars determined by GPC(LLS) were slightly higher than theoretical value. This $\bar{M}_n$ and the mole fraction of styrene obtained by $_1H$ NMR spectroscopy were used to calculate the $\bar{M}_n$ of PSt segments and the PSt content in star-block copolymers. The $\bar{M}_n$s calculated in this manner may be slightly higher, but more reliable than values obtained by DPC (LLS). The $\bar{M}_n$ and content of PSt were also calculated from the weight of polymer (conversion), assuming 100% isobutylene conversion. The true molecular weight of the PSt segments is probably between these two values.

Figure 16:
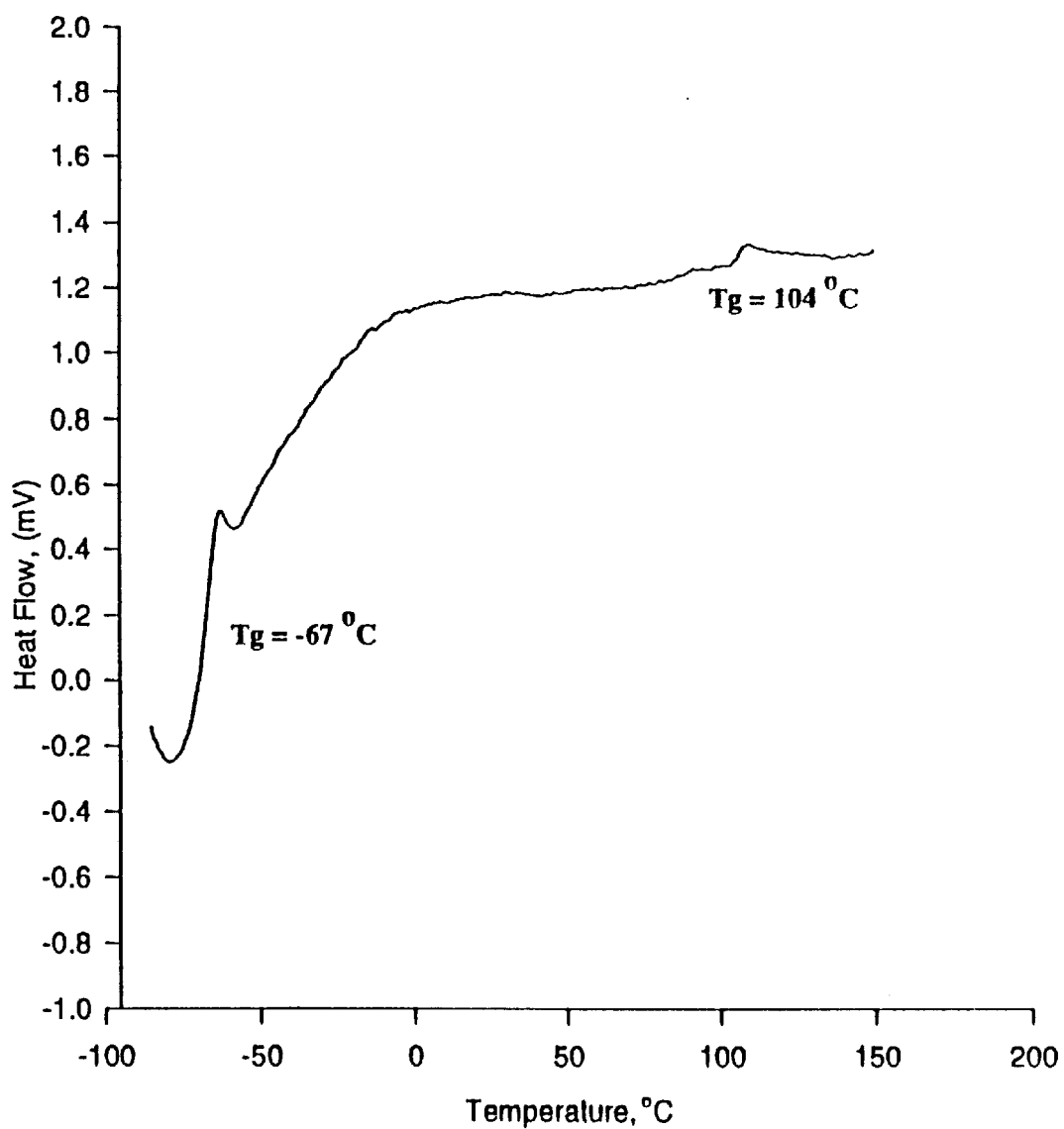
FIG. 16 is a DSC thermogram, demonstrating heat flow (mV) as a function of temperature, of a representative octa-arm (polystyrene-b-polyisobutylene) star block copolymer.

PIB and PSt phase. FIG. 16 shows the DSC thermogram of a representative star-block indicating two Tgs corresponding to the PIB (at −67° C.) and PSt (at 104° C.) segments.

One of the key features of TPEs is their high tensile strength. The role of PSt domains in the stress absorbing mechanism is well known. In the case of PSt-b-PBd/PIS-b-PSt TPEs, it has been found that failure occurs in the PSt domains. The lower strength of isobutylene-based thermoplastics compared to PSt-b-PBd/PIS-b-PSt has been postulated to be due to a different failure mechanism, or to the presence of diblock contamination, or to the existence of a broad interphase. But linear PSt-b-PIB-b-PSt triblock copolymer ionomers have showed higher tensile strength than the corresponding linear triblocks which contradicts the point of a different failure mechanism, i.e., failure in the rubbery region. More results are needed to substantiate these postulates.

TABLE II

| | $^a$PIB segment, g/mol × $10^{-3}$ | | | PSt-b-PIB star, g/mol × $10^{-3}$ | | | | |
|---|---|---|---|---|---|---|---|---|
| Ex. # | $\bar{M}_n$ (LLS) | $\bar{M}W$ (LLS) | $\bar{M}W/\bar{M}_n$ | $\bar{M}_n$, theor | $^b\bar{M}_n$ (LLS) | $^c\bar{M}_n$ (LLS) | $^c\bar{M}W$ (LLS) | $^c\bar{M}W/\bar{M}_n$ |
| 10 | 34 | 40 | 1.18 | 32 | 3.40 | 3.5 | 4.1 | 1.18 |
| 11 | 34 | 40 | 1.18 | 32 | 4.34 | 4.7 | 5.8 | 1.23 |
| 9 | 25 | 27 | 1.10 | 22 | 4.30 | 5.2 | 6.5 | 1.26 |
| 11' | 34 | 40 | 1.18 | 32 | 4.48 | 5.3 | 6.4 | 1.21 |
| 12 | 46 | 51 | 1.12 | 43 | 5.56 | 6.3 | 7.3 | 1.18 |

| | | PSt segment, $\bar{M}_n$, g/mol × $10^{-3}$ | | | Wt %, Polystyrene | | | |
|---|---|---|---|---|---|---|---|---|
| Ex. # | dn/dc $cm^3/g$ | GPC (LLS) | $^1H^d$ NMR | Conv. | GPC (LLS) | $^1H^d$ NMR | Conv. | $^e$Molecular structure of stars |
| 10 | 0.125 | 8 | 7 | 5.1 | 19 | 17 | 14 | $(PSt/7-b-PIB/34)_a-C8$ |
| 11 | 0.135 | 20 | 15 | 12 | 37 | 32 | 27 | $(PSt/15-b-PIB/34)_a-C8$ |
| 9 | 0.147 | 29 | 21 | 19 | 54 | 46 | 46 | $(PSt/21-b-PIB/25)_a-C8$ |
| 11' | 0.135 | 22 | 16 | 13 | 39 | 32 | 28 | $(PSt/16-b-PIB/34)_a-C8$ |
| 12 | 0.128 | 22 | 14 | 11 | 32 | 21 | 20 | $(PSt/14-b-PIB/46)_a-C8$ |

Figure 17:
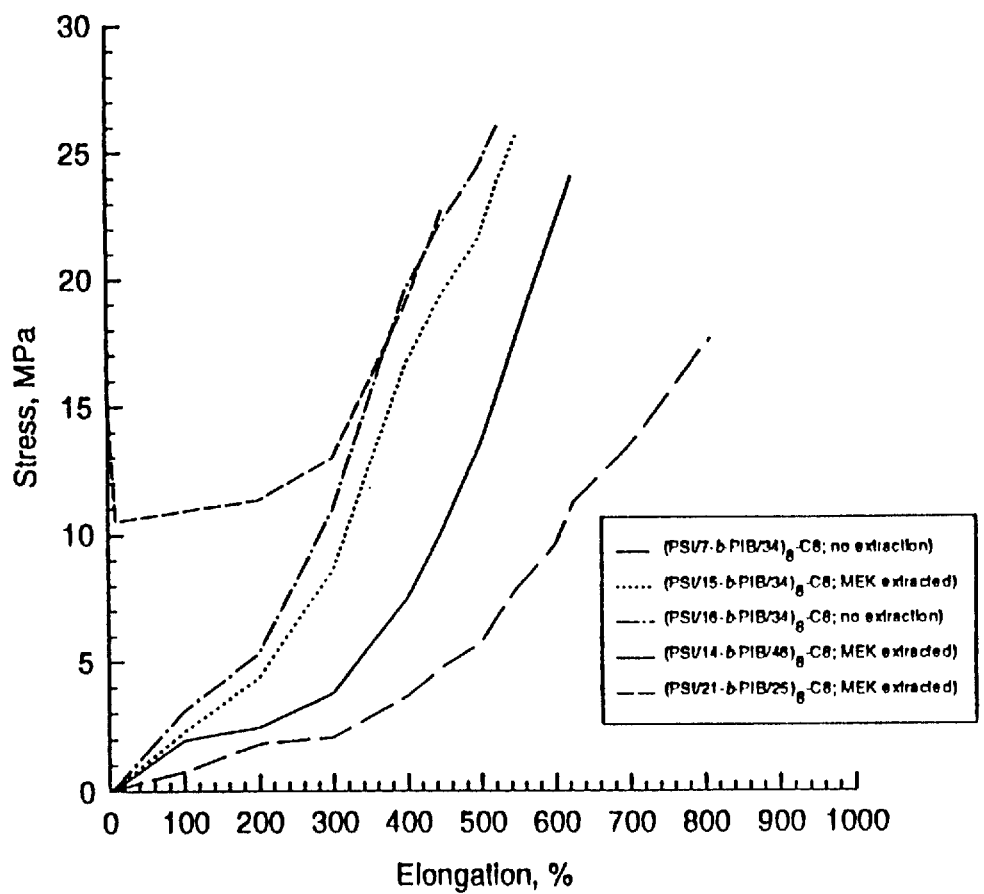
FIG. 17 is a series of stress-strain curves of various octa-arm (polystyrene-b-polyisobutylene) star copolymers.

$^a$calculated from homo PIB star based on theoretical number of arms, 8
$^b$determined excluding the high molecular weight region and used for calculating the $\bar{M}_n$ of PSt segment
$^c$determined by considering the whole area under the peak
$^d$$^1H$ NMR spectroscopy measurements were made on samples extracted with MEK. $\bar{M}_n$ of respective PIB segments and mole fraction of styrene obtained by $^1H$ NMR spectroscopy used. Contribution of the core to the aromatic region has been neglected.
$^e$PSt-b-PIB = polystyrene-b-polyisobutylene copolymer; first digit = $\bar{M}_n$ of PSt; second digit = $\bar{M}_n$ of PIB; C8 = calix[8]arene It is known that in PSt-b-PIB-b-PSt triblocks microphase separation starts as the molecular weight of the PSt segments approaches ~5,000 g/mol. Such copolymers show two distinct glass transition temperatures (Tg) corresponding to the The stress/strain properties of a set of select 'octa-arm' star-blocks were, therefore, investigated. FIG. 17 shows the plots and Table III summarizes the pertinent results of these tests.

TABLE III

| Sample | Molecular structure[a] | Wt % polystyrene[b] | Stress, MPa | Elongation, % |
|---|---|---|---|---|
| 10 | (PSt/7-b-PIB/34)$_8$-C8 | 17 | 17.6 | 810 |
| 11 | (PSt/15-b-PIB/34)$_8$-C8 | 32 | 25.6 | 550 |
| 9 | (PSt/21-b-PIB/25)$_8$-C8 | 46 | 22.7 | 450 |
| 11' | (PSt/16-b-PIB/34)$_8$-C8 | 32 | 26.0 | 525 |
| 12 | (PSt/14-b-PIB/46)$_8$-C8 | 21 | 24.0 | 625 |

[a]determined by a combination of GPC(LLS) and $^1$H NMR spectroscopy
[b]determined by $^1$H NMR spectroscopy All samples showed high strength and elongation. As mentioned earlier, all these samples contain 10–15% contaminant (diblock or diblock+homo PSt). Block stars (11 and 11') with ~32% (wt %) PSt showed the highest strength, ~26 MPa. Sample 11 was extracted by MEK before molding. It showed slightly higher elongation. Block star 11' was tested as a virgin sample to know how the presence of homo-PSt affects the properties. The modulus of sample 11' is slightly higher than sample 11. This may be due to the presence of homo PSt. The strength of these star blocks are superior to those of the strongest PSt-b-PIB-b-PSt triblocks (23–24 MPa) reported to date. The elongation increased slightly on increasing the PIB content (sample 12) without much decrease in strength. The star-block with 46% styrene (sample 9) behaved like a high strength plastic material on account of its high PSt content. Block star (sample 10) with a low PSt content, 17%, showed lower strength and higher elongation, possibly due to insufficient phase separation.

Thus, it should be evident that the stress-strain characteristics of these multi-arm (PSt-b-PIB)-C8 stars, as well as other properties, are superior to those of earlier PSt-b-PIB-b-PSt triblock TPEs and other PIB based TPEs.

From the foregoing specification, it should be evident that the foregoing methods of the present invention are highly effective in synthesizing linear and star-shaped polyisobutylenes and PIB-based block copolymers via the "core first" method, using multifunctional calixarene derivatives and their monofunctional analogues as initiators, in conjunction with Friedel-Crafts acids, to induce the living polymerization of cationic polymerizable monomers such as isobutylene. The invention is particularly suited for calix[8]arenes, but is not necessarily limited thereto. It has also been demonstrated that the resultant multi-arm polyisobutylene stars are well-defined, both at their arms and core, and that have comparatively a more definite number of arms, a more definite arm molecular weight and a narrower polydispersity than those stars having well-defined arms, but ill-defined cores. Such multi-arm star polymers are seen as having utility as viscosity modifiers and motor oil additives and the like, although it will be appreciated that the subject star polymers may be readily useful in a variety of applications, including the manufacture of other materials as well. The synthesis of star block copolymers provides for the preparation of useful TPEs as well.

Based upon the foregoing disclosure, it should now be apparent that the novel linear and star polymers described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, Freidel-Crafts acids employed according to the present invention are not necessarily limited to BCl$_3$ and/or TiCl$_4$. Moreover, any carbocationic polymerizable monomer may be substitute for the preferred isobutylene. Further, while 5,11,17,23,29,35,41,47-(2-methoxypropyl)-49,50,51,52,53,54,55,56-octamethoxycalix[8]arene is preferred, any tert-methoxy, tert-hydroxy, and tert-Cl derivatives of a calix[n]arene where n=4 to 16 may be a suitable multifunctional initiator. Other components specifically referred to in exemplification of the preferred embodiment may also have other substitutes. Thus, the scope of the invention shall include all modifications and variations that may fall within the scope of the attached claims.

What is claimed is:

1. A composition of matter comprising:
   a core component selected from the group consisting of a p-methoxy cumyl group and a calix[n]arene where n=4 to 16; and
   N number of arms containing at least one segment of polyisobutylene connected to said core component, where N=1 when said core component is said p-methoxy cumyl group and N=n, when said core component is said calix[n]arene.

2. A composition of matter as set forth in claim 1, wherein said core component is a calix[n]arene where n=6 to 16.

3. A composition of matter as set forth in claim 2, wherein said core component is a calix[8]arene.

4. A composition of matter as set forth in claim 1, wherein each said polyisobutylene arm has a functionalized tert-Cl group at the end thereof.

5. A composition of matter as set forth in claim 4, wherein the composition can be further functionalized based upon dehydrochlorination or substitution of said tert-Cl group.

6. A composition of matter as set forth in claim 1, wherein said arms further include at least one segment, incompatible with polyisobutylene, formed by cationic polymerization of a monomer other than isobutylene which is connected to the terminus end of said polyisobutylene to provide a polyisobutylene-based block copolymer.

7. A composition of matter as set further in claim 6, wherein said monomer is an aromatic monomer.

8. A composition of matter as set forth in claim 6, wherein said at least one segment is formed by the cationic polymerization of monomers selected from the group consisting of β-pirene, norbornene, styrene and derivatives thereof.

9. A composition of matter as set forth in claim 8, wherein said styrene derivatives include p-styrene, -alkyl styrene, α-methyl styrene, and indene.

10. A composition of matter as set forth in claim 1, wherein said composition has a polydispersity of less than 1.4.

11. A composition of matter as set forth in claim 1, wherein said composition has a polydispersity between 1.1 and 1.15.

12. A viscosity modifier comprising the composition of claim 1.

13. A thermoplastic elastomer comprising the composition of claim 6.

14. A thermoplastic elastomer as set forth in claim 13, wherein said monomer is an aromatic monomer.

15. A thermoplastic elastomer as set forth in claim 13, wherein said at least one segment is formed by the cationic polymerization of monomers selected from the group consisting of β-pirene, norbornene, styrene and derivatives thereof.

* * * * *